Aug. 9, 1966  A. W. KATH  3,264,802
CAPSULE FORMING AND FILLING MACHINE
Filed Jan. 20, 1964  20 Sheets-Sheet 1
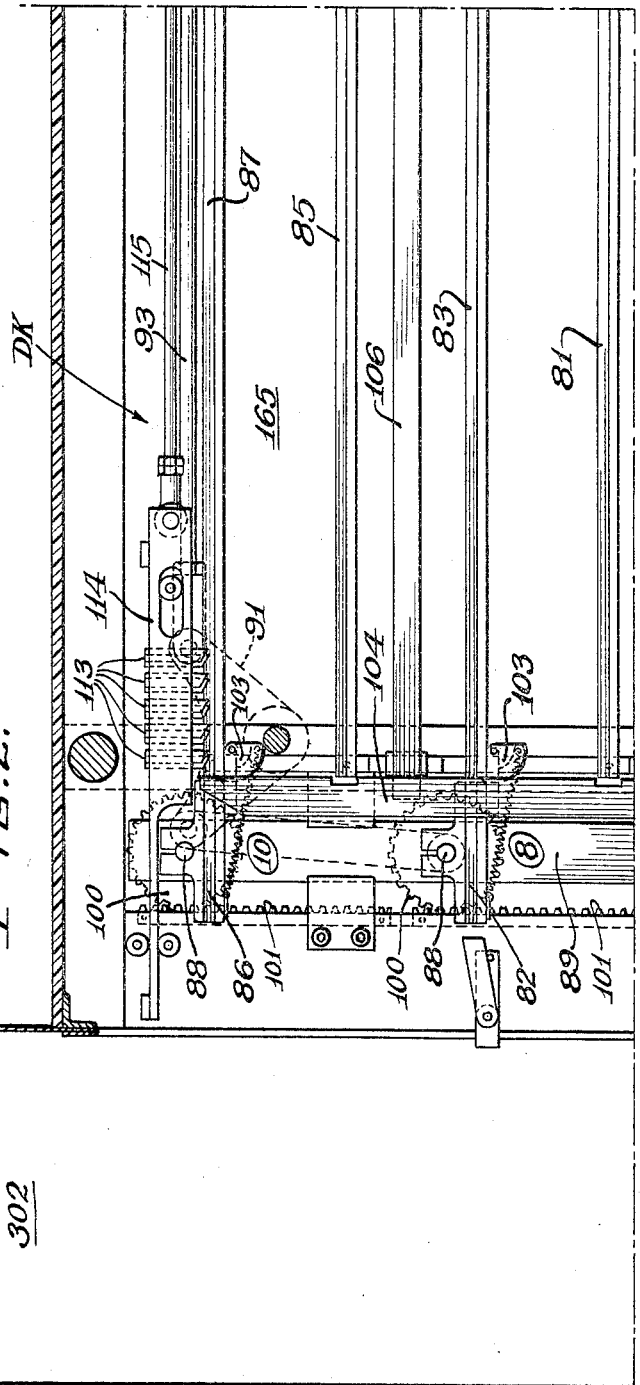

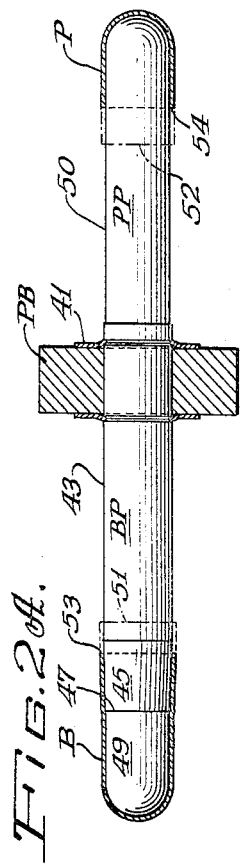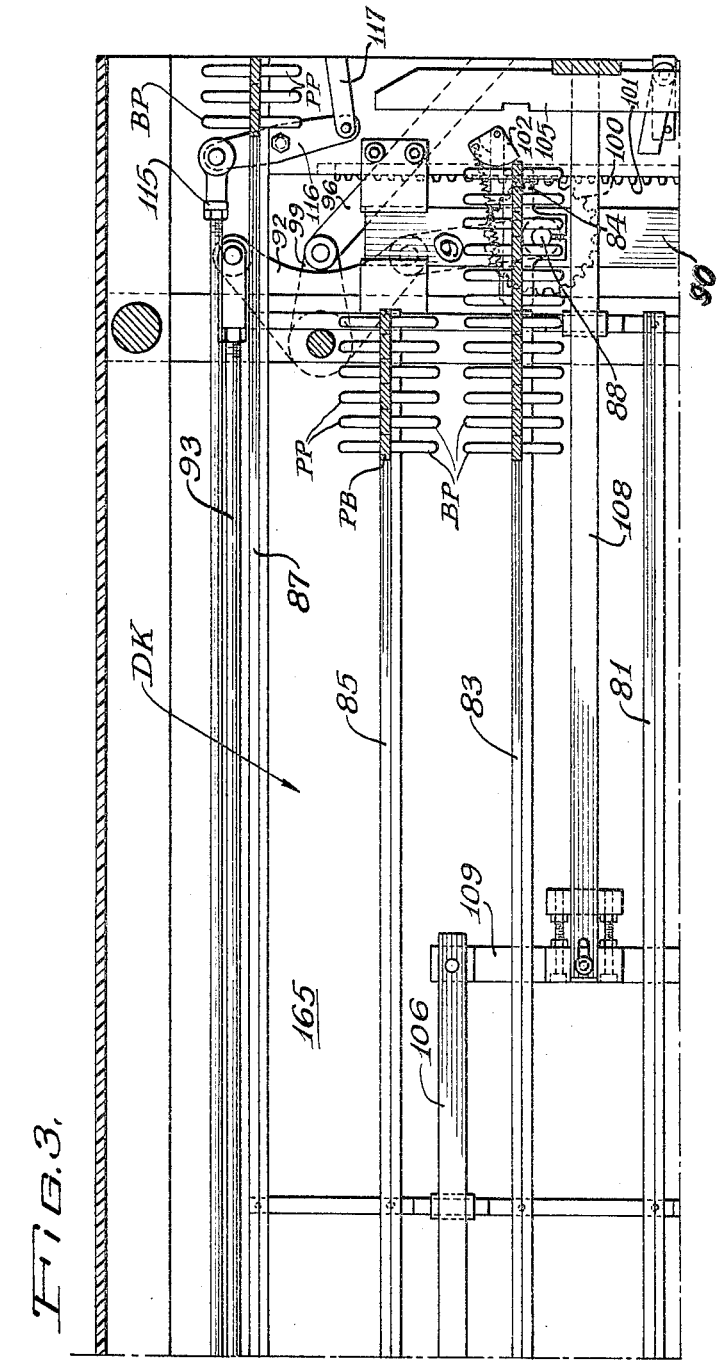

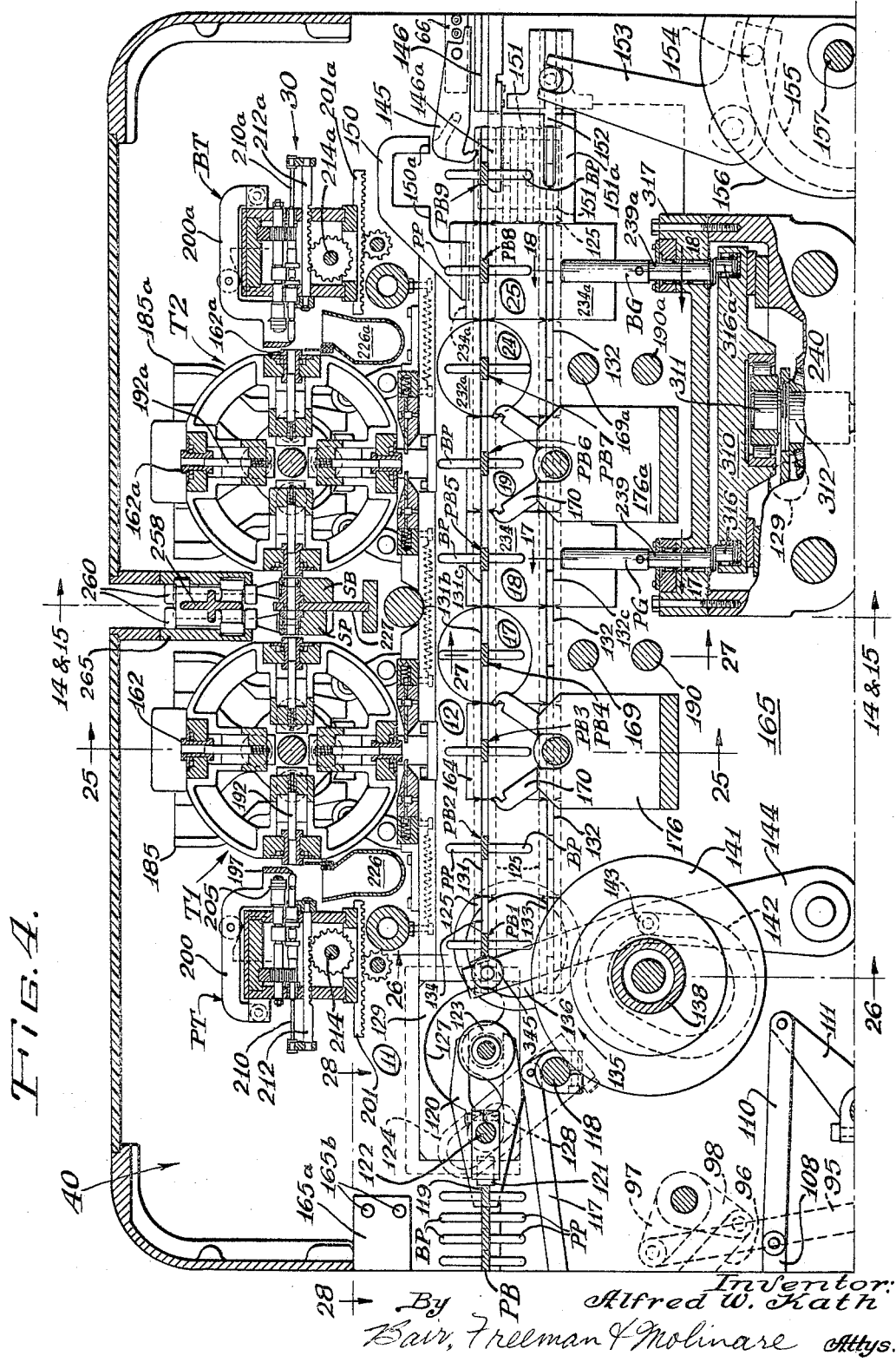

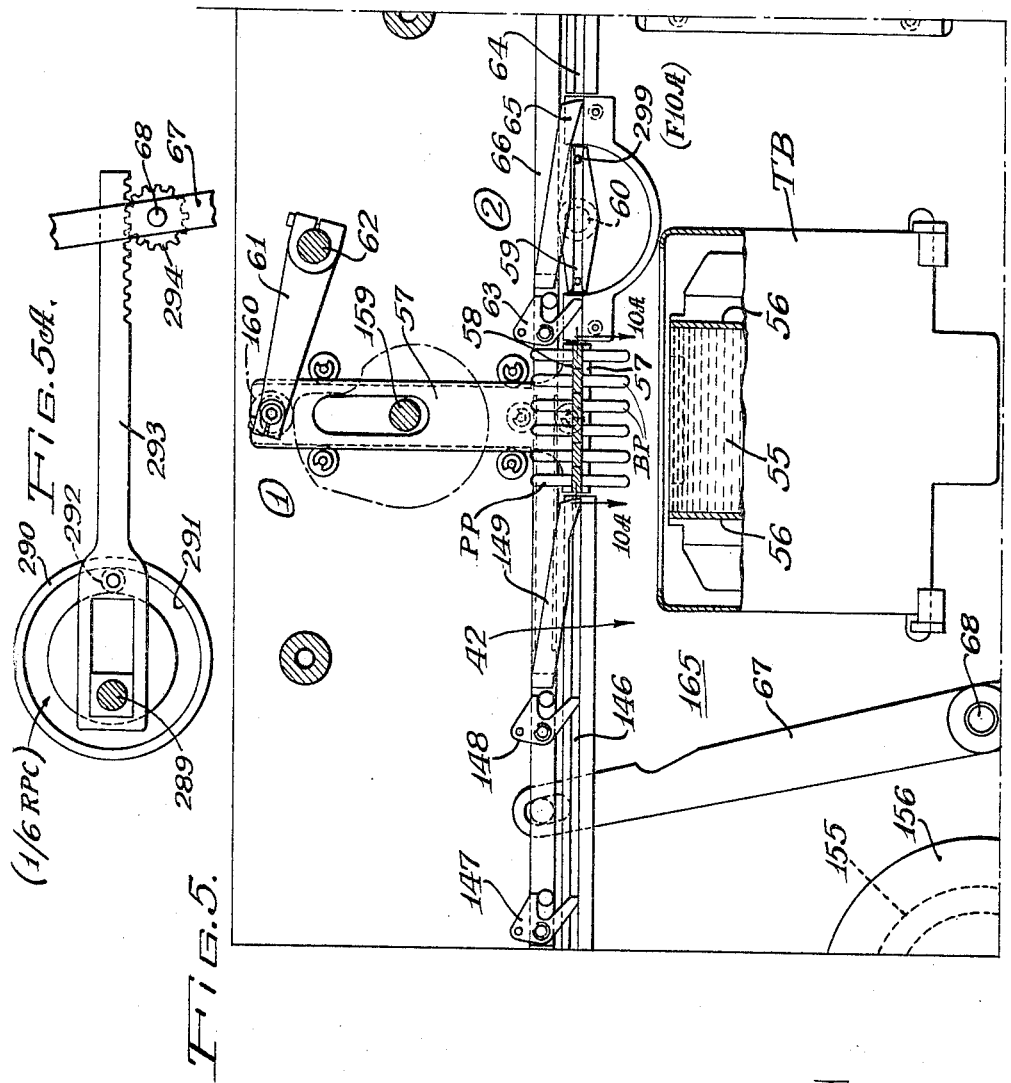

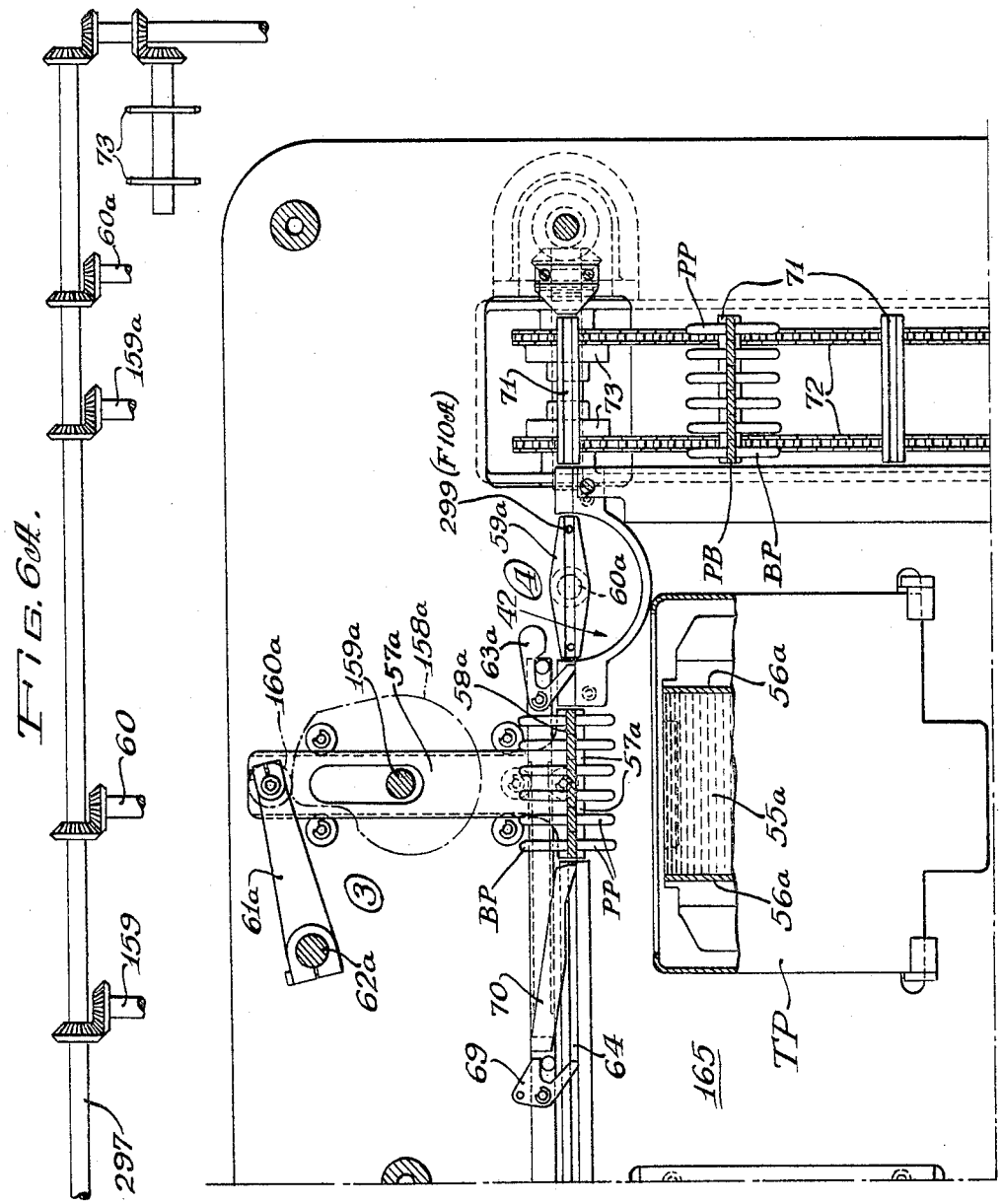

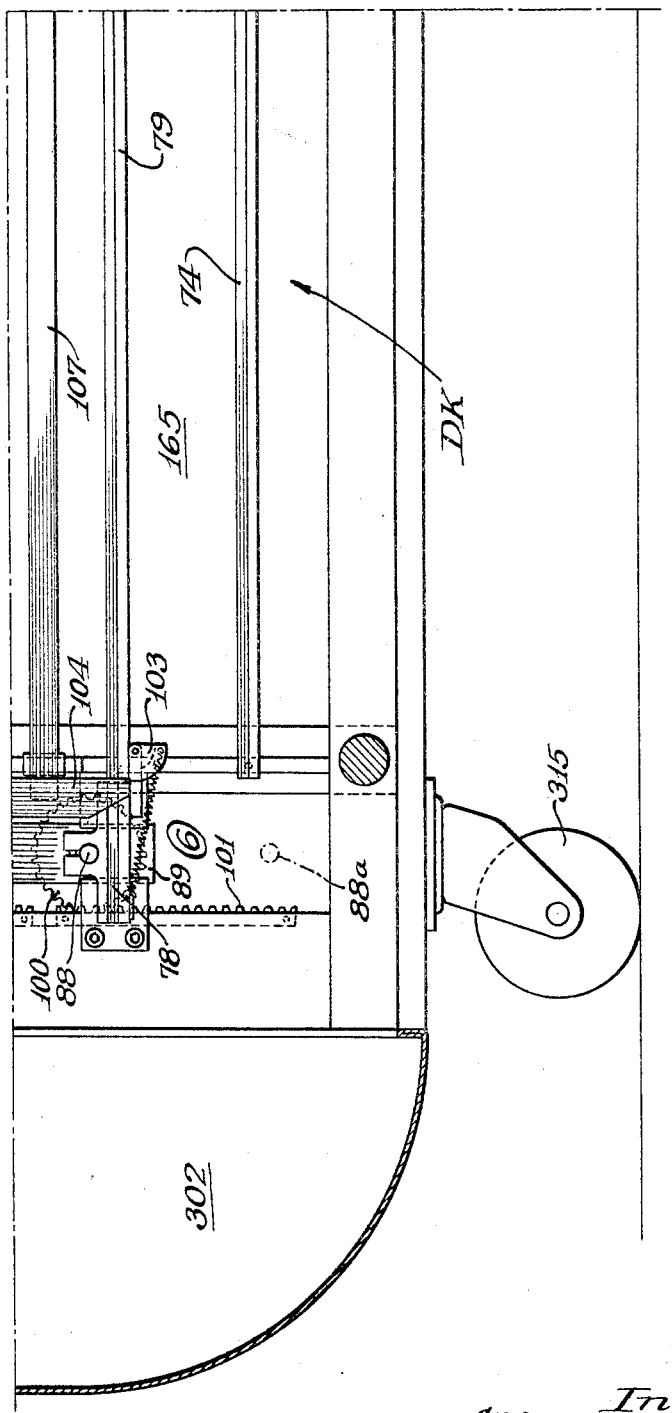

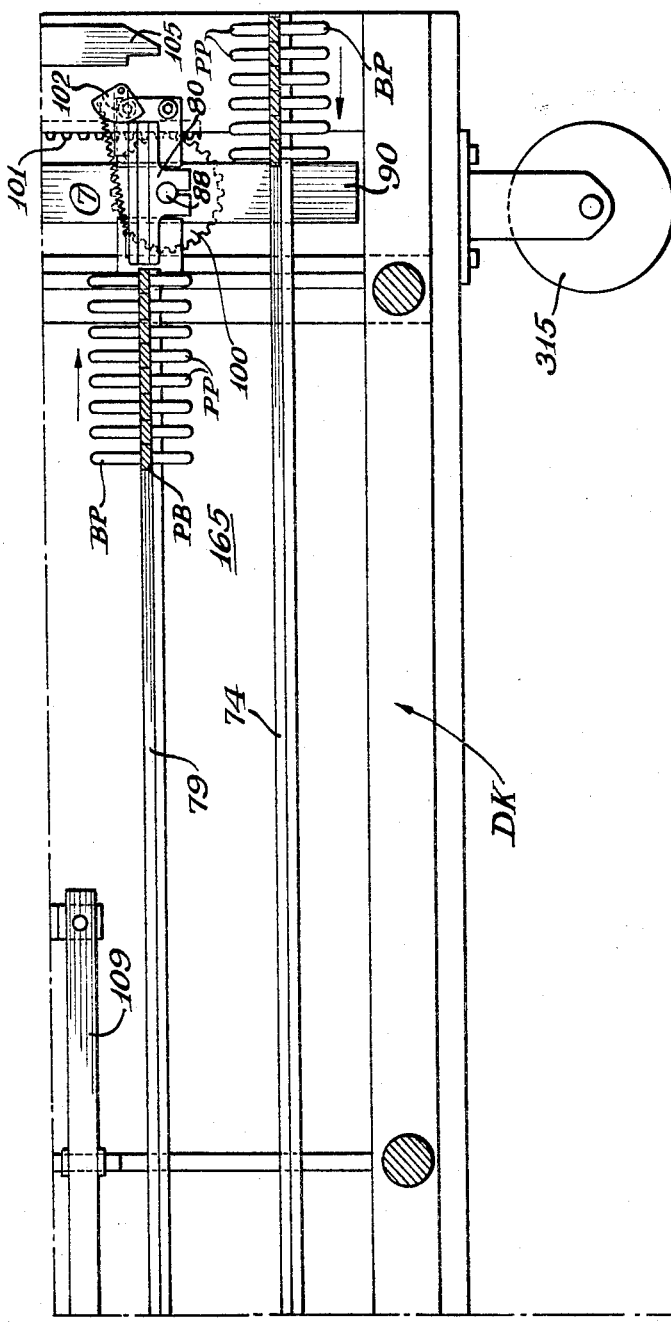

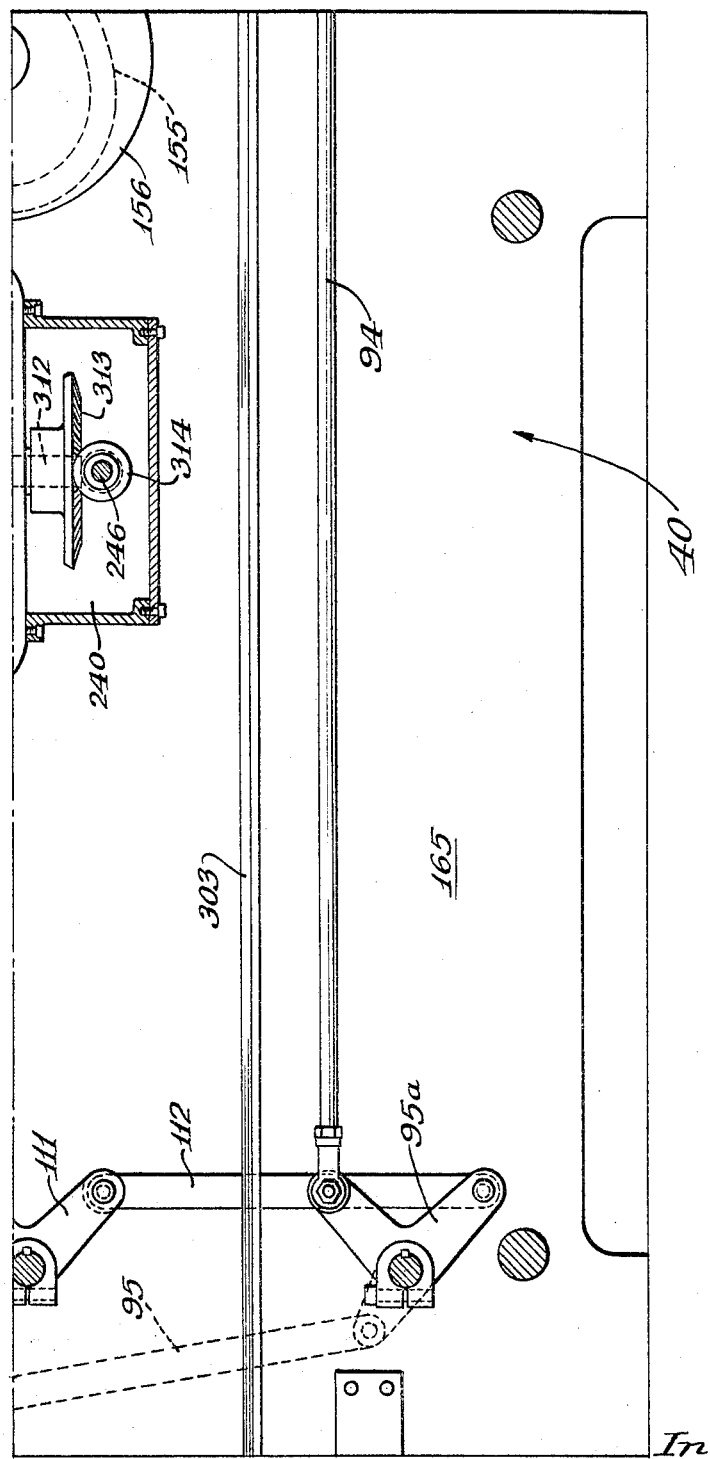

Aug. 9, 1966  A. W. KATH  3,264,802
CAPSULE FORMING AND FILLING MACHINE
Filed Jan. 20, 1964  20 Sheets-Sheet 9
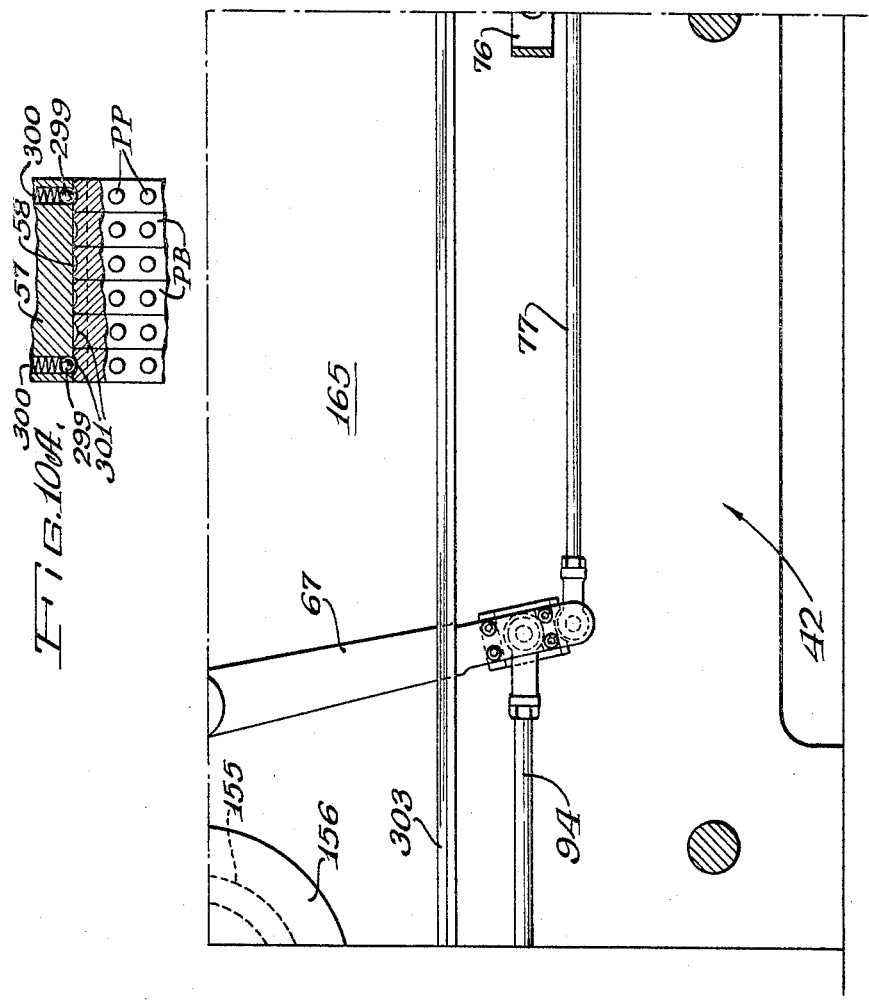
Inventor:
Alfred W. Kath
By Bair, Freeman & Molinare
Attys.

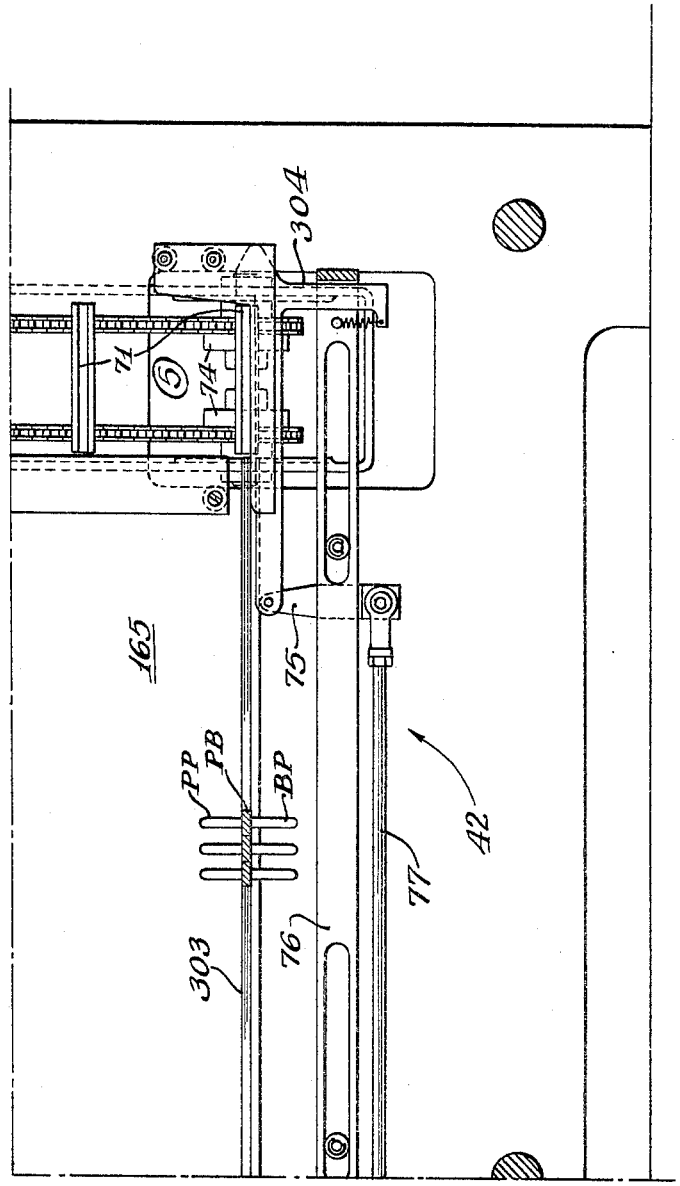

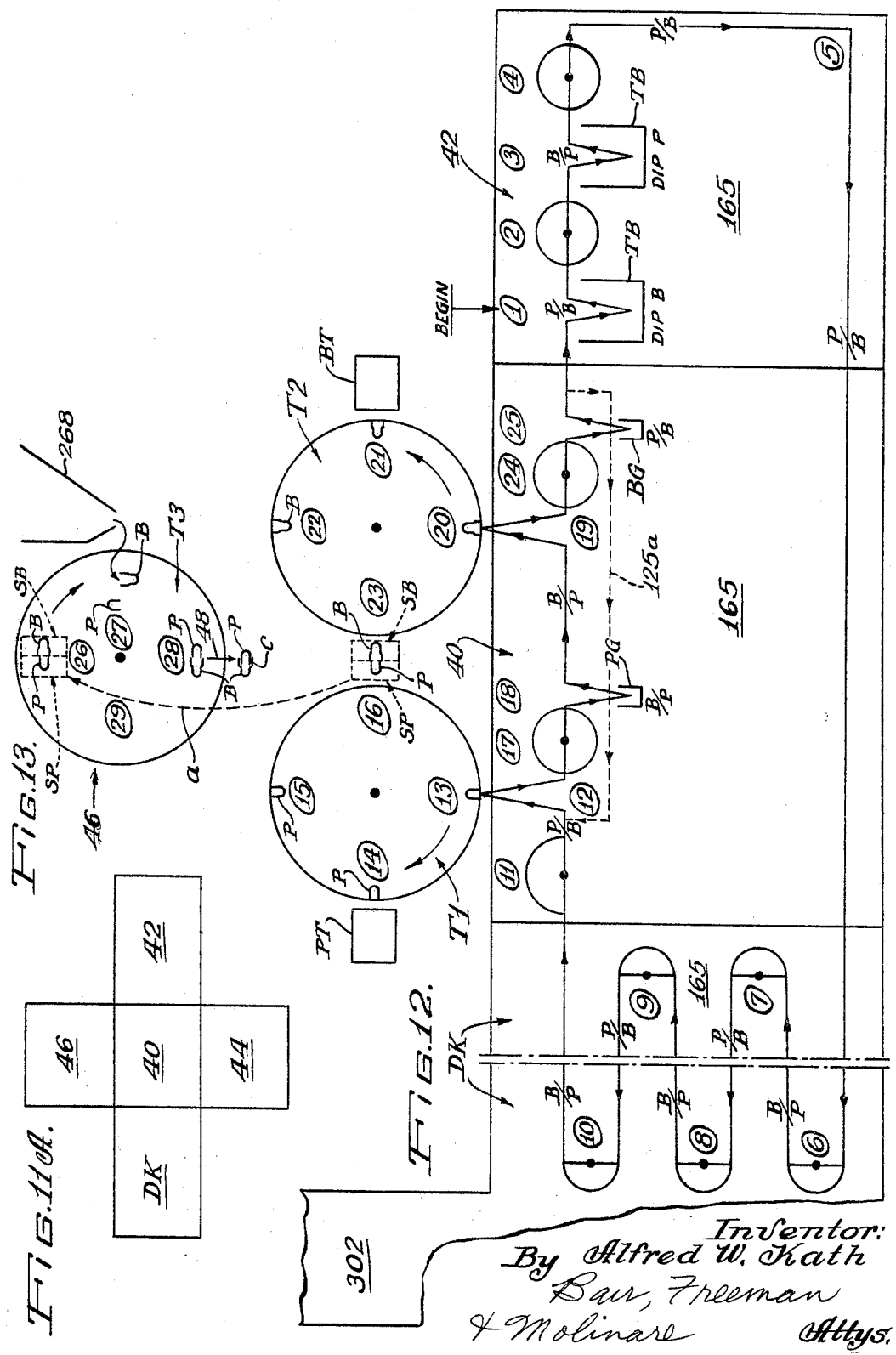

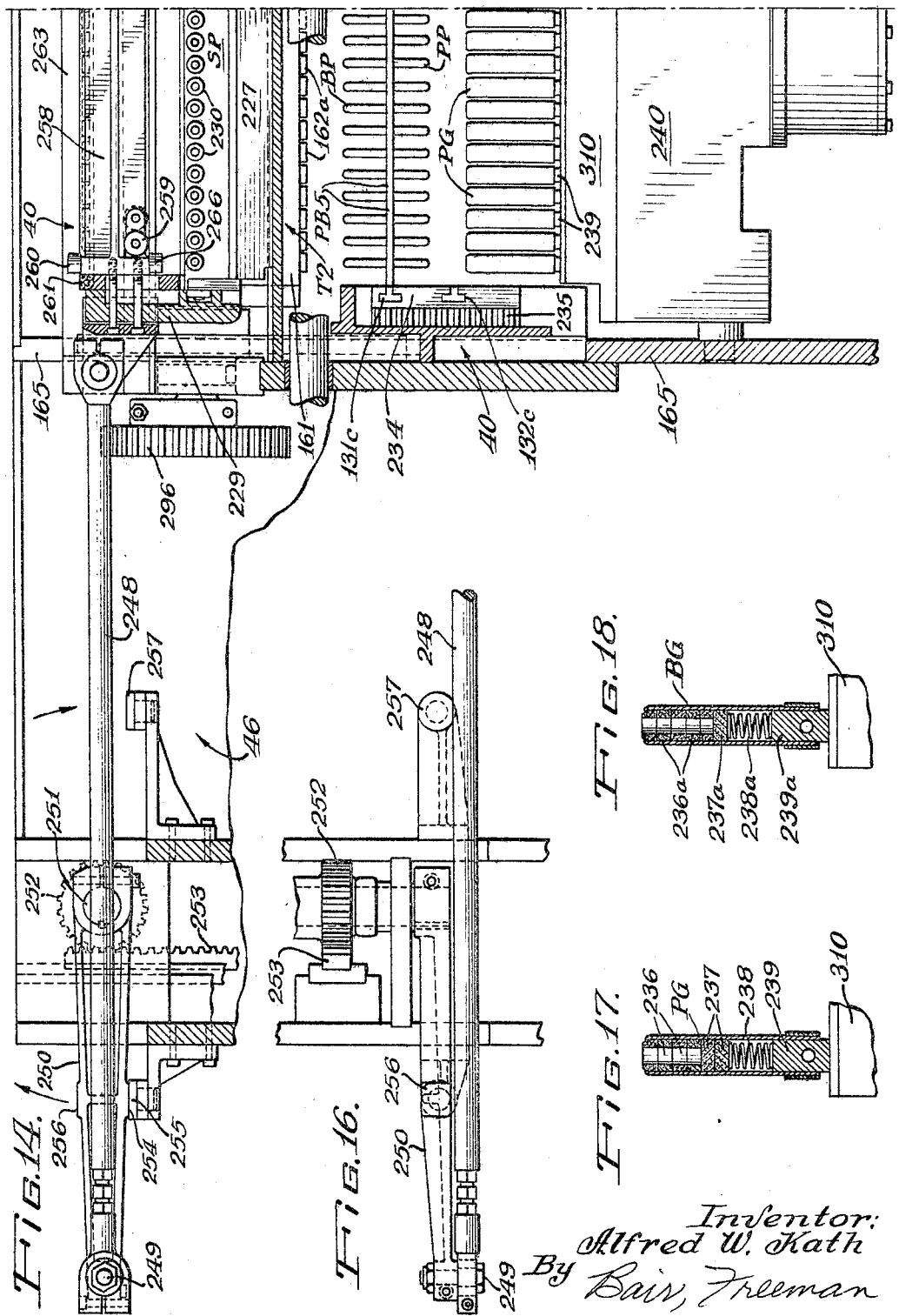

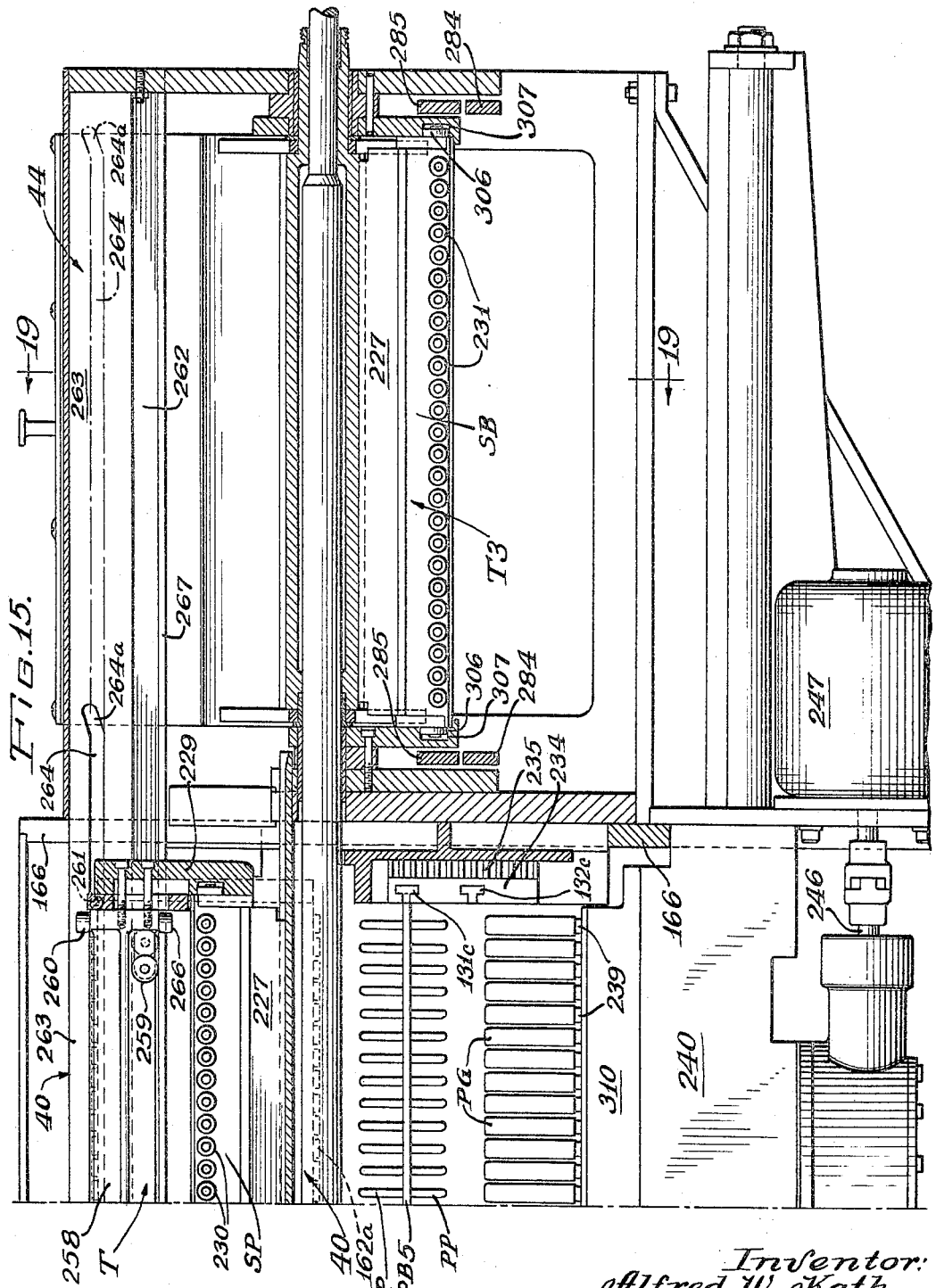

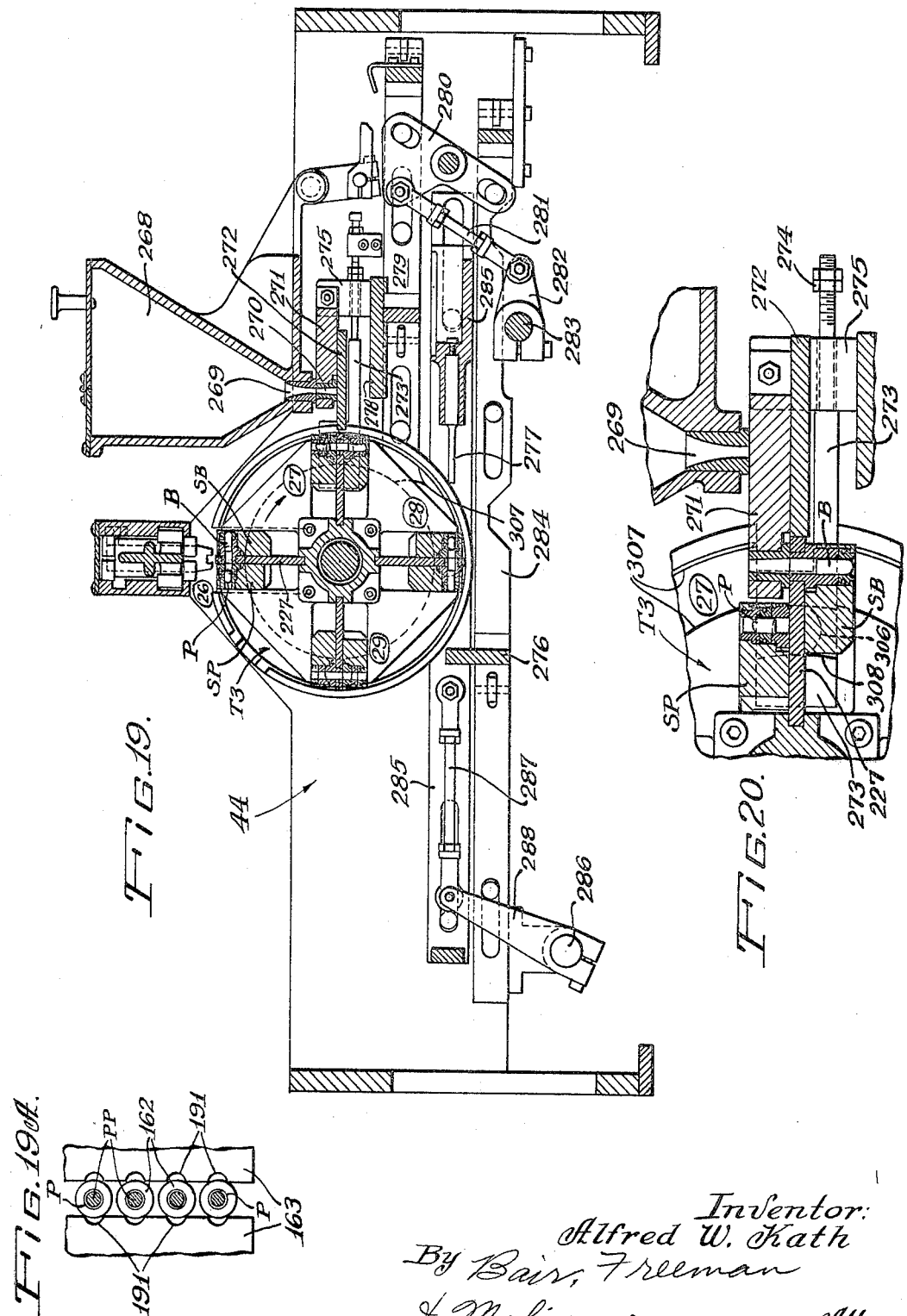

Aug. 9, 1966   A. W. KATH   3,264,802
CAPSULE FORMING AND FILLING MACHINE
Filed Jan. 20, 1964   20 Sheets-Sheet 15

Inventor:
Alfred W. Kath
By
Bair, Freeman & Molinare
Attys.

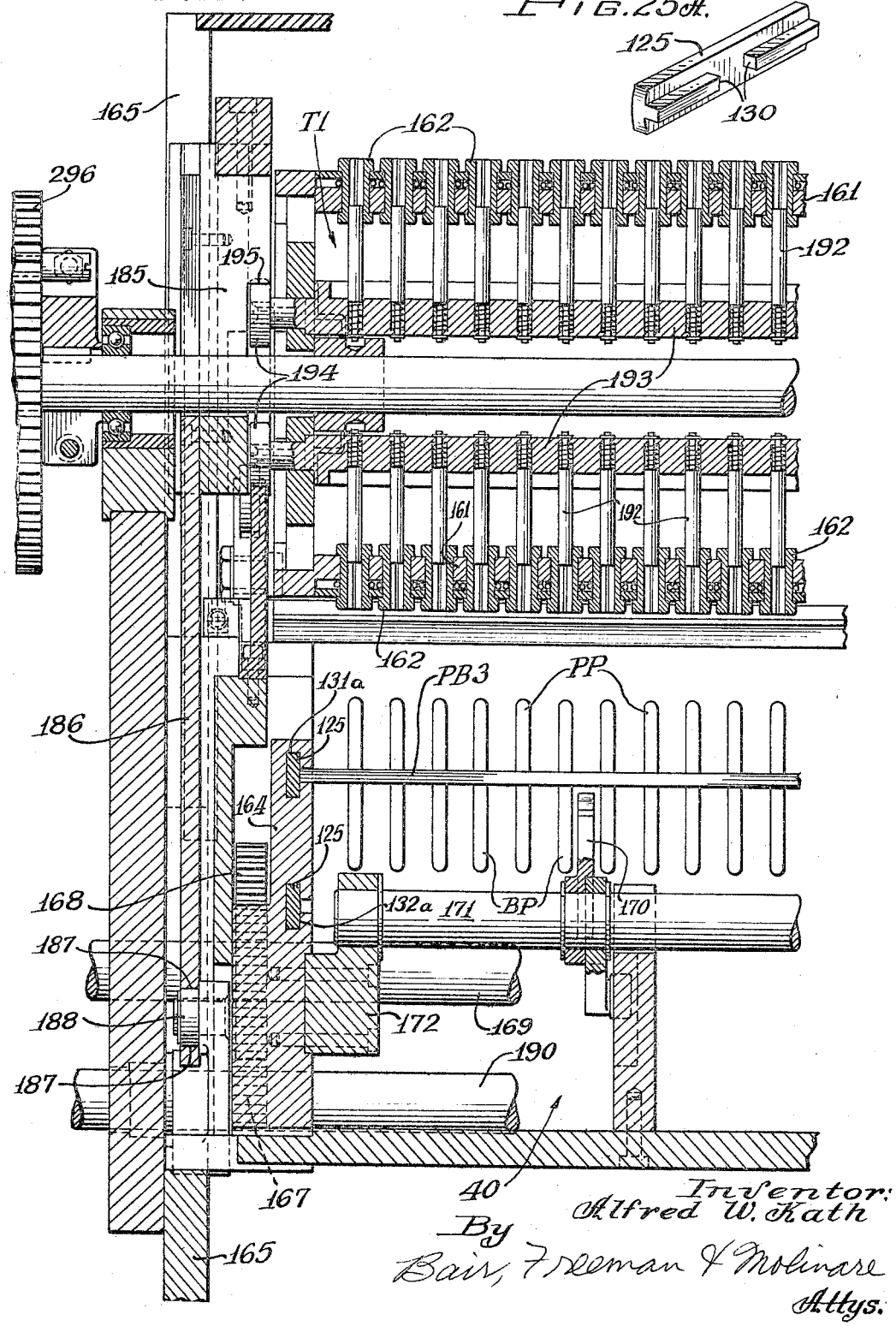

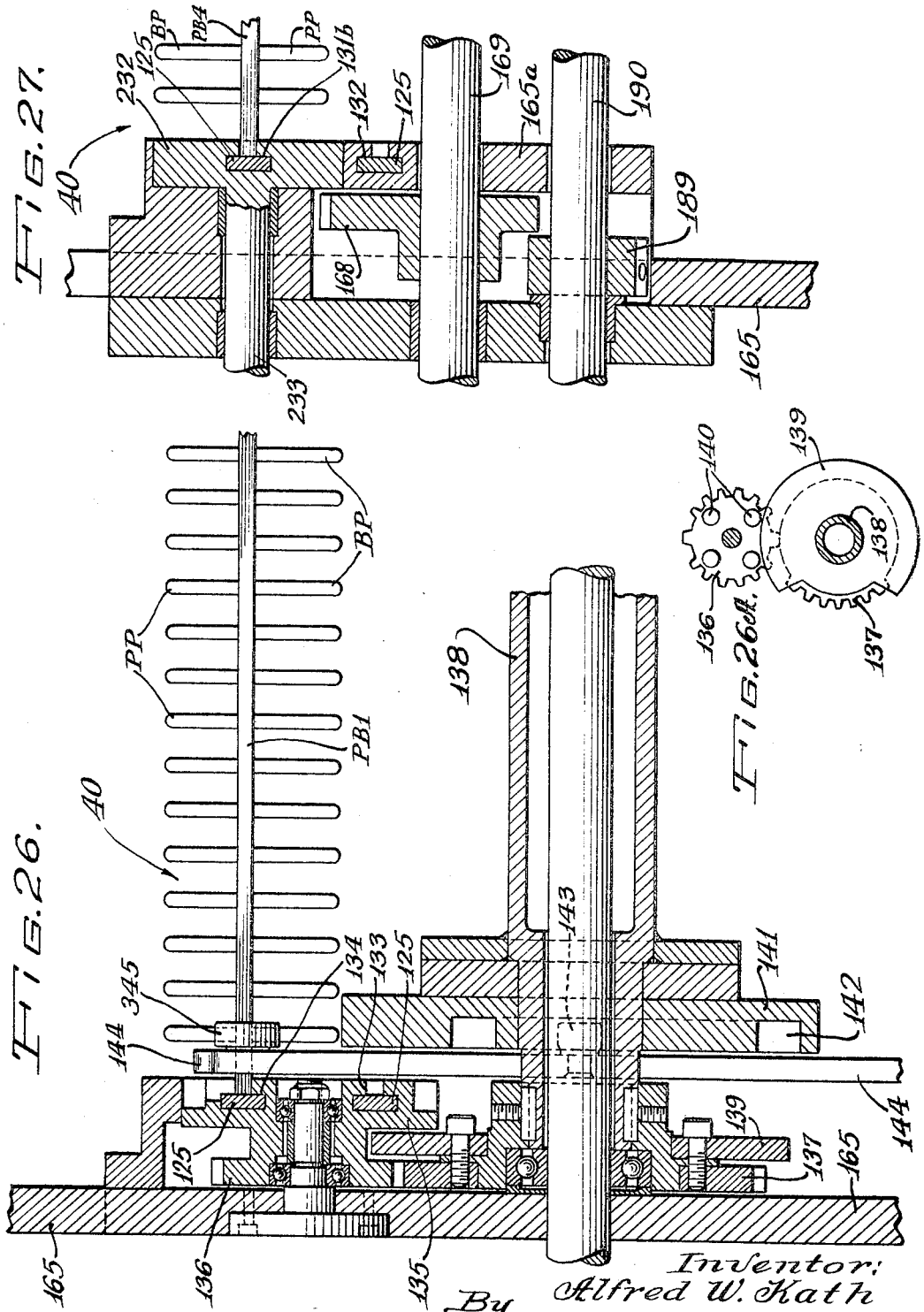

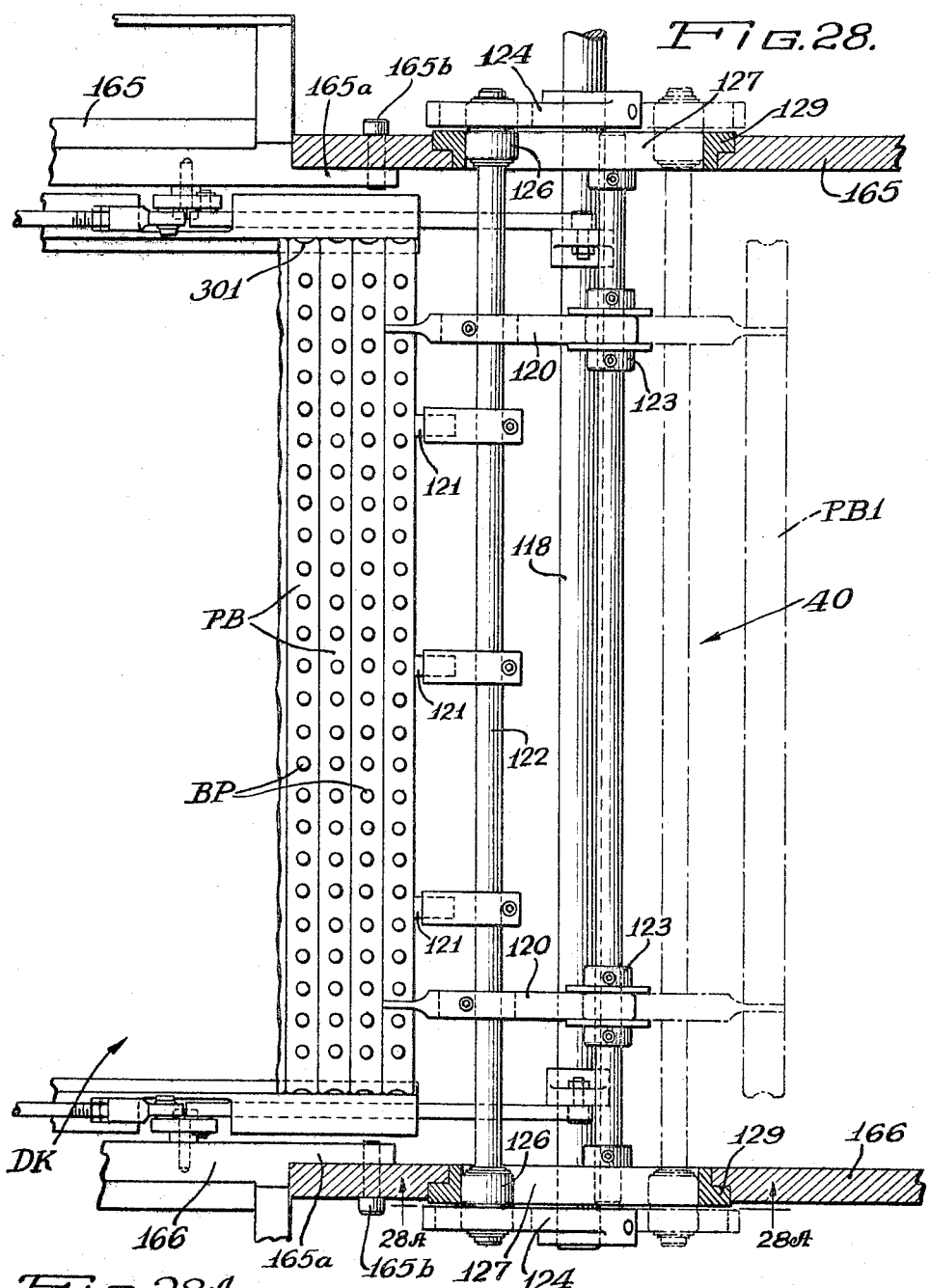

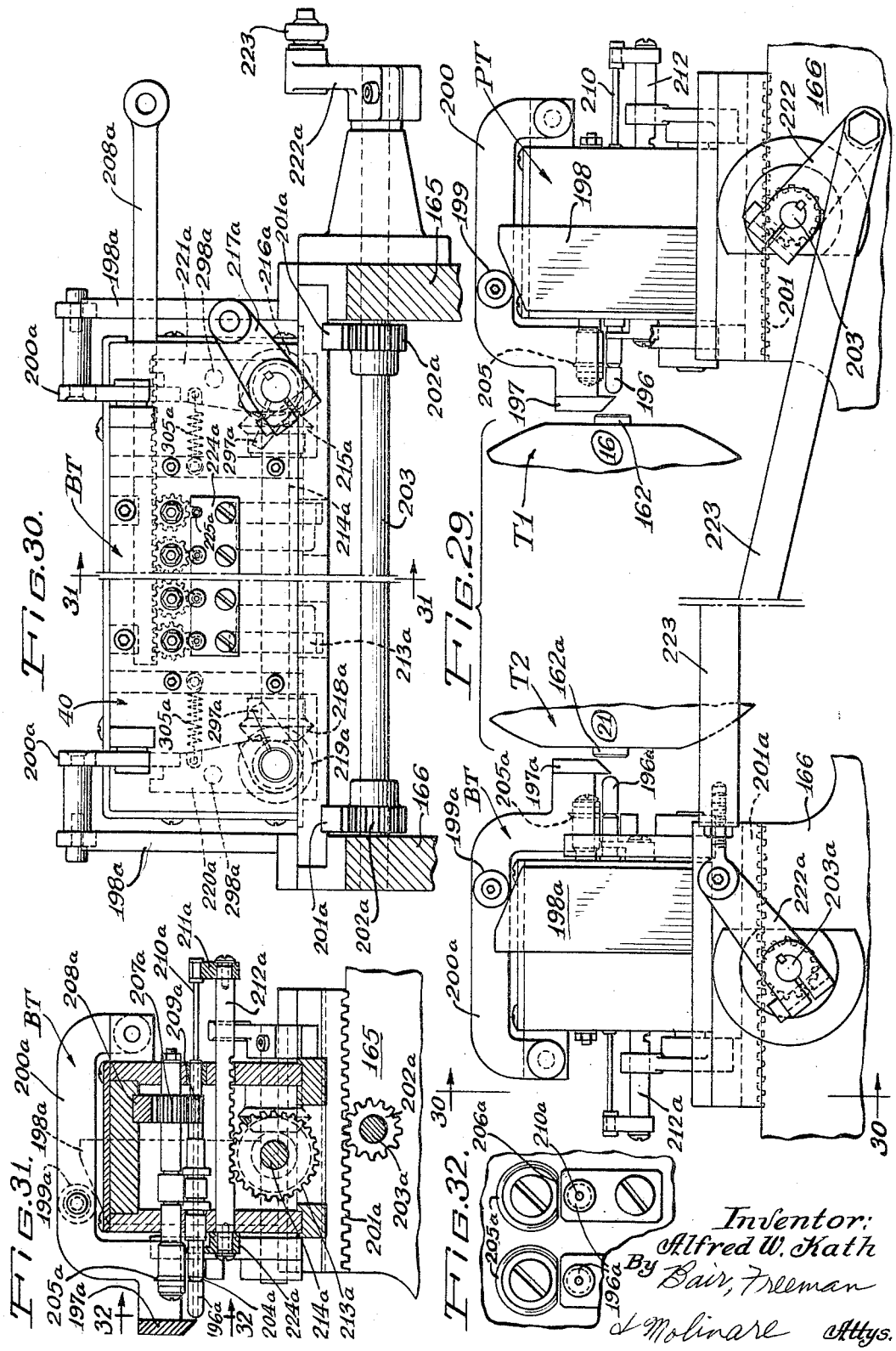

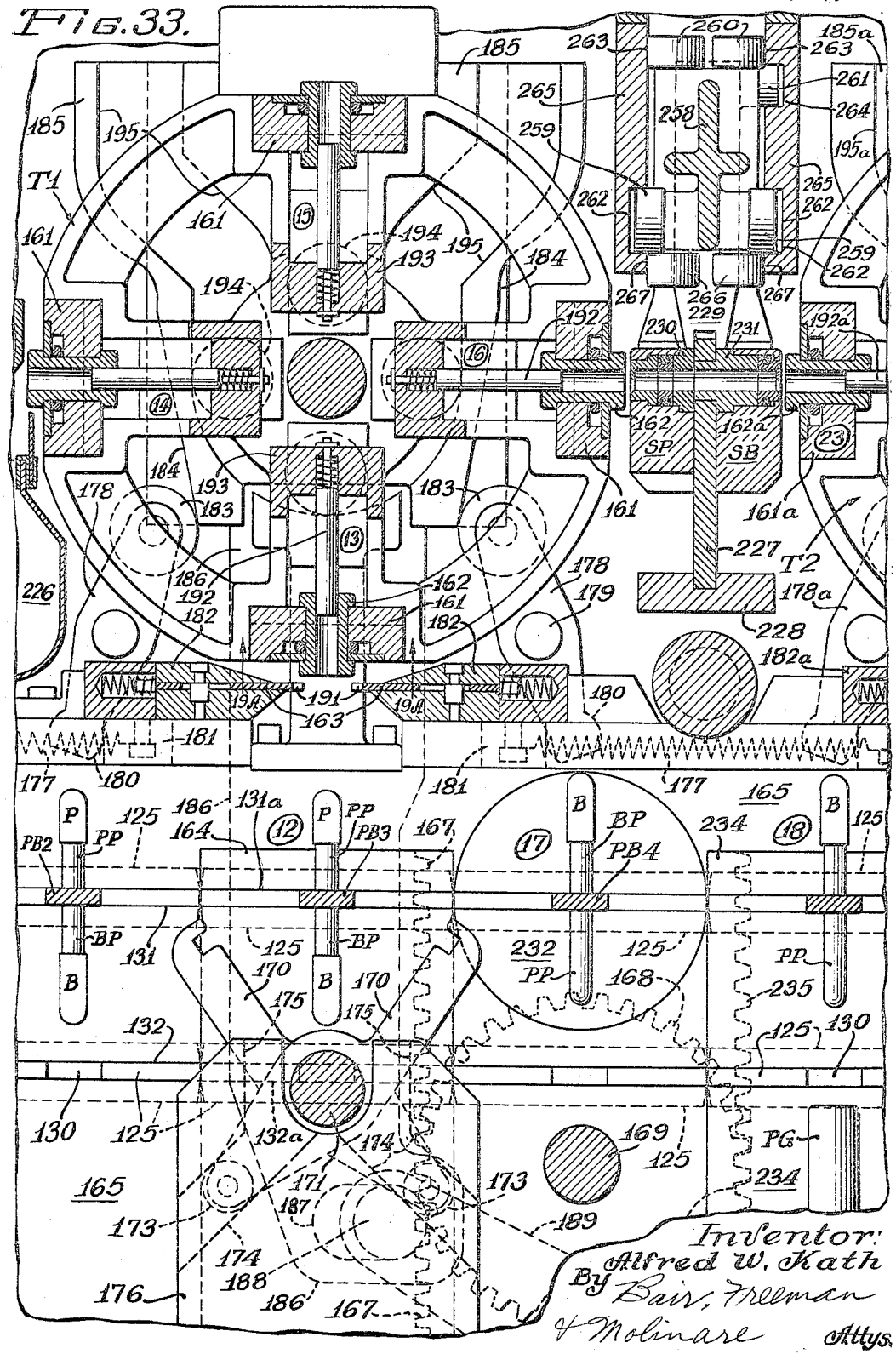

United States Patent Office 3,264,802
Patented August 9, 1966

3,264,802
CAPSULE FORMING AND FILLING MACHINE
Alfred W. Kath, Grosse Pointe, Mich., assignor to R. P. Scherer Corporation, Detroit, Mich., a corporation of Michigan
Filed Jan. 20, 1964, Ser. No. 338,832
49 Claims. (Cl. 53—140)

This invention relates to a capsule forming and filling apparatus which forms hard shell capsules and fills them with powdered medicament whereupon they are discharged from the machine, the apparatus being particularly designed for hard shell capsules of the kind shown in my copending application, Serial No. 118,072, filed June 19, 1961, now abandoned.

One object of the invention is to provide such an apparatus which performs the forming and filling operations automatically and has many advantages and improvements over prior machines particularly as to simplicity of construction, speed of operation and reduced cost of operation.

In the art of making hard shell gelatin capsules there has been much progress over a period of a great many years from the original hand operations to relatively large expensive and complicated automatic machinery. Such machinery is now being successfully employed in the production of hard shell gelatin capsules but suffers from certain recognized drawbacks and disadvantages. Most of the machines are so large that they require much floor space and are expensive to manufacture and maintain. While they work quite satisfactorily they are rather intricate and complicated in construction and expensive to manufacture and thus, to some extent, these factors have limited their use. In working in this art for a great many years and having personally designed and developed many of the existing machines, I have realized that it would be highly desirable to be able to produce hard shell gelatin capsules on a much smaller, less expensive and less complicated machine which would not only have these inherent advantages but which would also enable capsule making to be more widely distributed geographically with the attendant advantages of so doing. The present invention, therefore, is especially directed to a solution of the foregoing problems.

Another object of the invention is to provide a relatively simple, inexpensive hard shell capsule making machine, having ample facilities therein for drying the capsule bodies and plugs in an efficient manner which drying operation requires the major amount of space in the machine.

Another object is to provide an apparatus for forming gelatin capsule bodies and plugs, drying the same, stripping the plugs and bodies from the pins of pin bars and greasing the pins before they are again dipped in gelatin tanks for the next forming operation.

Another object is to provide an apparatus which handles a plurality of pin bars having body pins and plug pins projecting from opposite sides thereof, which dips one pin in a gelatin tank and then turns the pin bar over to dip the other pin therein.

Still another object is to provide unidirectional air flow through the drying kiln combined with means for presenting different faces of the capsule bodies and plugs to the air flow to secure uniform drying of the bodies and plugs.

Still another object is to provide means for advancing the pin bars through the machine, six at a time while dipping the pins, so that this operation can be done slowly, and one at a time when stripping the bodies and plugs from the pins of the pin bars and greasing the pins.

Still another object is to provide novel turnover means for the pin bars in the drying kiln which also elevate them for back-and-forth travel on progressively higher decks in the drying kiln.

A further object is to provide a recirculating system of bar carriers for the pin bars while the plugs and bodies are being stripped therefrom and while the pins are being greased.

A further object is to provide separate plug and body turrets which receive the plugs and bodies stripped from the pins of the pin bars and which are indexed for presenting the plugs and bodies to plug and body trimmers which trim the plugs and bodies to uniform length and which turrets also are operable to eject the plugs and bodies into sockets of a pair of socket bars so that the turrets are then again ready to receive further plugs and bodies stripped from the pins of the pin bars.

A further object is to provide a transfer bar assembly which includes the socket bars and which is operable to transfer them to a fill turret and return the empty socket bars to the plug and body turrets for reception of additional plugs and bodies.

Still a further object is to provide means for indexing the fill turret and during the indexing operation for separating the plug laterally from the body so that the body can be filled with powdered medicament whereupon the plug is brought back into alignment with the body.

Still a further object is to provide at one station of the fill turret a means to insert the plug into the body to thus form a filled capsule which is then discharged from the fill turret thus completing the capsule forming and filling operations.

An additional object is to provide a capsule forming and filling apparatus comprising a dipping, stripping, trimming, pin greasing, filling, joining and discharging apparatus in the form of a stationary part of the machine and a drying kiln which is a portable part thereof so that it can be disconnected from the rest of the machine and another drying kiln substituted when it is desirable to change capsule sizes which requires a change in all the pin bars of the machine. Thus drying kilns with different sizes of pin bars may be provided and it is necessary only to change the pin bars in the rest of the machine when changing from one size to another.

With these and other objects in view, my invention consists in the construction, arrangement and combination of the various parts of my capsule forming and filling apparatus, whereby the objects above contemplated are attained, as hereinafter more fully set forth, pointed out in my claims and illustrated in detail on the accompanying drawings, wherein:

FIG. 1 is a diagram of FIGS. 2 to 11, inclusive, showing the arrangement of patent drawing sheets which, combined, make up a total vertical cross section longitudinally of my capsule forming and filling machine;

FIGS. 2 to 11 depict said vertical cross section at one quarter full scale, FIG. 4 of the group showing details of plug and body turrets;

FIG. 2A is a sectional view through a pin bar and shows a pin therethrough on one end of which a capsule body is formed and on the other end of which a capsule plug is formed, the body and plug being shown in cross section thereon;

FIG. 5A is a diagrammatic view of a cam shaft and another shaft driven thereby and is a typical drive connection used for a number of driven shafts throughout the machine;

FIG. 6A is a diagrammatic plan view of certain driven shafts of FIGS. 5 and 6 and a common shaft for driving them so that the driven shafts are rotated simultaneously from the common shaft;

FIG. 10A is an enlarged sectional view on the line 10A—10A of FIG. 5 showing detent means for holding a plurality of pin bars in a pin bar carrier;

FIG. 11A is a diagrammatic plan view of the machine;

Figure 21:
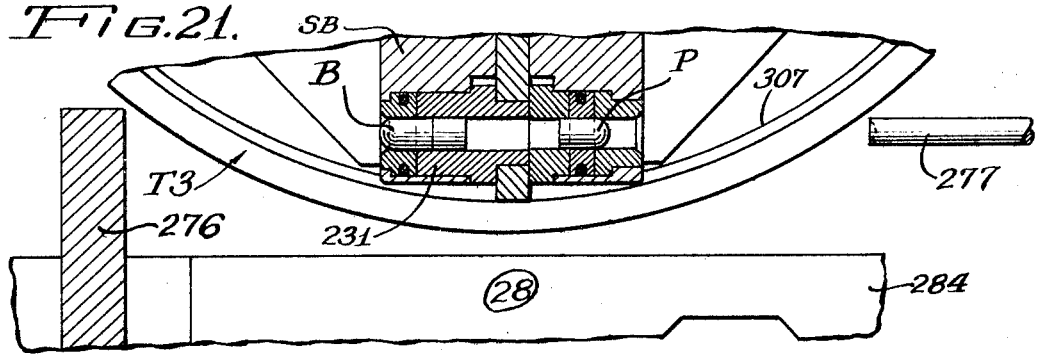

FIG. 12 is a diagrammatic vertical section corresponding to FIGS. 2 to 11 showing all operations that are performed in the machine with the exception of filling the capsules, closing them and discharging them, said operations comprising the dipping of pins to form capsule bodies and plugs, the drying of the bodies and plugs, the removal of the bodies and plugs from the pins, the trimming of the bodies and plugs, the deposit thereof in a transfer bar and the greasing of the body and plug pins;

FIG. 13 is a similar diagrammatic view showing the filling of the capsule bodies with powdered medicament, the insertion of the capsule plugs into the bodies to form a capsule and the discharge of the filled capsules from the machine;

FIGS. 14 and 15 together are a vertical sectional view on the lines 14 and 15—14 and 15 of FIG. 4 showing the operation of a transfer bar assembly;

FIG. 16 is a plan view of the left half of FIG. 14;

FIGS. 17 and 18 are enlarged vertical sectional views on the lines 17—17 and 18—18, respectively, of FIG. 4 showing a plug pin greaser and a body pin greaser;

FIG. 19 is a vertical sectional view on the line 19—19 of FIG. 15 showing details of a fill turret;

FIG. 19A is an enlarged horizontal sectional view on the line 19A—19A of FIG. 33 showing stripper blades for capsule plugs on plug pins;

FIG. 20 is an enlargement of a portion of FIG. 19 to show some parts in greater detail and showing certain parts in a different position;

FIGS. 21, 22, 23 and 24 are further enlargements of the lower portion of the turret and adjacent parts shown in FIG. 19, certain parts being illustrated in different positions for closing and discharging the filled capsules from the machine;

FIG. 25 is an enlarged vertical sectional view on the line 25—25 of FIG. 4 showing details of a plug turret;

FIG. 25A is a perspective view of a bar carrier;

FIG. 26 is an enlarged vertical sectional view on the line 26—26 of FIG. 4;

FIG. 26A is a diagrammatic view of a mutilated gear drive for a transfer disc of the machine;

FIG. 27 is an enlarged vertical sectional view on the line 27—27 of FIG. 4;

FIG. 28 is a plan view partly in section on the line 28—28 of FIG. 4 showing a flop-over device for pin bars leaving the drying kiln and entering the turret section of the machine;

FIG. 28A is a sectional view on the line 28A—28A of FIG. 28;

FIG. 29 is an enlargement of plug and body trimmers shown in FIG. 4, and is viewed from the reverse side to show an operative connection between the two;

FIG. 30 is an elevation of the body timmer on the indicated line 30—30 of FIG. 29;

FIG. 31 is a sectional view of the body trimmer on the line 31—31 of FIG. 30;

FIG. 32 is an enlarged end view of a portion of FIG. 31 on the indicated line 32—32 thereof;

FIG. 33 is a vertical sectional view in the form of an enlargement of a plug turret shown in FIG. 4 to show greater detail.

On the accompanying drawings I have used a number of reference characters to indicate the most important and significant elements and assemblies of my capsule forming and filling machine and the capsules formed thereby as follows:

| | |
|---|---|
| B—Body | T1—Plug Turret |
| P—Plug | T2—Body Turret |
| C—Capsule | T3—Fill Turret |
| PB—Pin Bar | SP—Socket Bar (Plug) |
| BP—Body Pin | SB—Socket Bar (Body) |
| PP—Plug Pin | PT—Plug Trimmer |
| TB—Tank (Body) | BT—Body Trimmer |
| TP—Tank (Plug) | PG—Plug Pin Greaser |
| DK—Drying Kiln | BG—Body Pin Greaser |

The above elements are for the most part located between a far side frame member 165 shown throughout FIGS. 2 to 12 and 14 and a near side frame member 166 opposite it and shown in FIGS. 15 and 28.

Referring first to FIG. 11A, my machine in plan view comprises a drying kiln section DK at the left, a center turret section or main unit for stripping, trimming and greasing shown at 40, a dipping section 42 at the right, a drive section 46 on the far side of the center section 40 and a filling and joining section 44 on the near side of the center section.

Referring to FIG. 12, operations are performed in the machine at 29 different stations identified (1) to (29) as (1) Body Dipping—operations may be considered as starting here as indicated "BEGIN"

(2) Pin Bar Turnover (3) Plug Dipping (4) Pin Bar Turnover

The Pin Bars are then lowered to station (5) and are then conveyed to station (6)

(6) Pin Bar Turnover, after which the pin bars are conveyed to station (7)

(7) Pin Bar Turnover, after which the pin bars are conveyed to station (8)

(8) Pin Bar Turnover, after which the pin bars are conveyed to station (9)

(9) Pin Bar Turnover, after which the pin bars are conveyed to station (10)

(10) Pin Bar Turnover, after which the pin bars are conveyed to station (11)

(11) Pin Bar Flop-over

(12) Elevation of Pin Bar to station (13) in turret T1 where plug is stripped from pin of Pin Bar T1 rotates to bring capsule plug to plug trimmer unit PT at station (14), then to station (15) which is an idle station, then to station (16) for ejecting plug into socket bar SP, then to station (13) for picking up another plug, each quarter rotation of the turret T1 occurring during an operating cycle of the machine for picking up at station (13) four plugs per rotation of the turret

(17) Pin Bar Turnover

(18) Plug Pin Greasing

(19) Elevation of Pin Bar to station (20) in turret T2 where body is stripped from pin of Pin Bar T2 rotates to bring capsule body to body trimmer unit BT at station (21), then to station (22) which is an idle station, then to station (23) for ejecting body into socket bar SB, then to station (20) for picking up another body, each quarter rotation of the turret T2 occurring during an. operating cycle of the machine for picking up at station (20) four bodies per rotation of the turret

(24) Pin Bar Turnover

(25) Body Pin Greasing

The pin bars are then moved to station (1) which is the beginning of operations as already mentioned.

When the plugs and bodies are deposited in the socket bars SP and SB, they are transported (arrow a) from section 40 to section 44 of FIG. 11A, the section 44 also being shown in FIG. 13 where fill turret 23 is illustrated. At the end of such transport the plugs and bodies are at station (26) whereupon the turret T3 is indexed clockwise 90°.

At station (27) the socket bars are relatively moved to offset the plug out of alignment with the body, the body is filled from a hopper 268 and the plug is again brought back into alignment with the body whereupon they move from station (27) to station (28). At station (28) the plug and body are closed to form a capsule which is then discharged from the turret T3 as indicated by the arrow 48, the filled and joined capsule being indicated C. Another 90° of rotation takes the socket bars to an idle station (29) and a further 90° of rotation positions them at the initial station (26).

Referring next to FIG. 2A, the pin bar PB is shown in cross section at about twice full size. The body pin BP and the plug pin PP are actually one pin of special shape projecting from opposite sides of the bar and held assembled in the bar by means of retainer washers 41 coacting with grooves of the pin. The body pin BP has three sections 43, 45 and 47, the section 43 being the original size of the overall pin, the section 45 being a tapered section terminating in a shoulder 47 and the section 49 being a reduced diameter section with a rounded outer end. The pin PP comprises a single section 50 having a rounded outer end. These pins are adapted to be dipped in melted gelatin to form the body B and the plug P shown in cross section on the outer ends of the total pin, the initial lengths being indicated at 51 and 52, and the trimmed lengths at 53 and 54.

Throughout FIGS. 2 to 11, inclusive, the pin bars PB, the body pins BP and the plug pins PP are shown in cross section similar to but without the details of FIG. 2A, being shown merely as single-diameter pins but with BP longer than PP. Only a few of the bars and pins are shown throughout the machine whereas there may be as many as 635 bars. As shown in FIGS. 14 and 15 the bars are elongated and of sufficient length to support 25 sets of pins making a total of 15,875 pins throughout the machine. In FIGS. 12 and 13 the plugs and bodies of the capsule have been shown of a shape simulating the actual shape shown in FIG. 2A.

When the plug P is inserted into the portion of the body B formed on the tapered section 45 of the pin, the body readily receives the plug and the inner end of the plug is squeezed into the tapered part of the body and against the shoulder 47 in an obvious manner and as fully disclosed in my copending application above referred to.

Referring again to FIG. 12, station (1) indicated "BEGIN," pin bars with the pins greased are delivered to this station and dipping takes place in the tank TB rather slowly so that there is no turbulence in the body of liquid gelatin shown at 55 in FIG. 5. This tank has weir walls 56 and the gelatin is pumped upwardly between these walls where the pins are dipped to flow over their upper edges and into the space outside the walls. The gelatin is heated and its temperature maintained automatically by thermostatic control in a well known manner as shown, for instance, in my Patent No. 2,869,178, and a motor drive pump circulates the gelatin upwardly inside the weir walls 56, the upper edges of the walls maintaining the desired level of liquid gelatin. While the pins are being lowered into the tank, the motor and pump are shut off so as to further reduce turbulence in the body of liquid gelatin. As soon as the dipping has been completed the motors are started up again for circulating the gelatin, all in a well known manner.

Throughout most of the machine the pin bars PB are advanced six at a time and the pins projecting from them are dipped six at a time. At station (1) a pin bar carrier 57 (see FIG. 5) is shown to receive one end of each of the six pin bars and carry them vertically downward for dipping the pins projecting from the lower ends thereof in the gelatin 55, and then return them upwardly to the initial position shown. The pin bar carrier 57 shown is adjacent the farside side frame 165 and there is a duplicate carrier in reverse adjacent the nearside side frame 166. Throughout FIGS. 2 to 12 other carriers and the like, and tracks for the pin bars, are shown for one side of the machine, and duplicate carriers and tracks are provided for the other side. Accordingly, only the carrier or track adjacent the side frame 165 will be described with the understanding that to properly support the pin bars similar carriers and tracks are provided adjacent the side frame 166 in an obvious manner. Each carrier 57 has a slot 58 of such length as to receive six pin bars.

After the six bars have been lifted from the gelatin bath, it is desirable to invert the bars 180° in order to dip the pins on the reverse side thereof, the body pins BP having been dipped at station (1). For this purpose a pin bar carrier 59 at station (2) is shown mounted on a shaft 60 so that it can be rotated. The carrier 59 is slotted in a manner similar to the carrier 58.

For vertically reciprocating the carrier 57, an arm 61 is provided mounted on a rock shaft 62, the drive for which will be later described. The arm 61 carries a roller 160 which coacts with a cam 158 on a cam shaft 159 rotated once each six cycles of operation of the machine.

The six pin bars in the carrier 57 are advanced therefrom into the carrier 59 by means of a pawl 63, and are thereafter advanced from the carrier 59 into a track 64 by a pawl 65. The pawls 63 and 65 are mounted on a reciprocating pawl bar 66. The pawl bar is oscillated by a rocker arm 67 on a rock shaft 68 which is rocked once each six cycles of the machine.

The track 64 as shown in FIG. 6, leads to a second pin bar carrier 57ᵃ similar to the carrier 57 where the pin bars are lowered with respect to the tank TP at station (3) and the plug pins are dipped at this station. Also at this station reference numerals 55ᵃ through 62ᵃ and 158ᵃ through 160ᵃ will be found applied to elements similar to those at stations (1) and (2). Pawls 69 and 70 are also provided on the pawl bar 66 for advancing pin bars along the track 64 and into the carrier 57ᵃ.

After turnover of the pin bars in the carrier 59ᵃ, a pawl 63ᵃ advances the six bars into a slotted carrier 71 of an elevator comprising a series of the carriers 71 mounted on chains 72 which are trained around upper sprockets 73 and lower sprockets 74 (FIG. 11). The chains as viewed in FIG. 5 move downwardly and the movement is intermittent as will hereinafter appear.

One purpose of inverting the pin bars and their pins at station (2) is, of course, to position the plug pins PP so that they project downwardly for dipping in the tank TP. Another purpose is to cause the gelatin to be evened out over the surface of the pin so that the thickness of the gelatin capsule formed by dipping is uniform along its entire length. For this reason the pin bars are also inverted at station (4). The pins of the pin bars are simultaneously dipped at station (1) and (3), simultaneously turned over at stations (2) and (4) and simultaneously moved downward to station (5), all pin bars being on the move at the same time and likewise being advanced by the various pawls and the chains 72 at the same time.

After the pin bars PB arrive at station (5) in FIG. 11, they are advanced six bars at a time along a trackway 303 extending throughout the sections 42 and 40 as shown in FIGS. 11, 10 and 9. Such advance is effected by means of a pawl 304 shown in FIG. 11 which is pivoted to a bracket 75 carried by a slide bar 76 which is operatively connected by a link 77 to the rocker lever 67 in FIG. 10. The bars are delivered from the left-hand end of the track 303 in FIG. 9 to the right-hand end of a track 74 in FIGS. 8 and 7 in the drying kiln, section DK of the machine and eventually to a turnover carrier 78 located at station (6). The carriers 78, like the carriers 57 and 59, are slotted to receive the ends of six pin bars. They deliver the bars to a track 79 shown in FIGS. 7 and 8 where they travel toward the right to a second turnover carrier 80 located at station (7) and the bars are advanced along further tracks 81, 83, 85 and 87 and are turned over by further turnover carriers, a third one 82, a fourth one 84 and a fifth one 86 at stations (8), (9) and (10). The direction of travel of the pin bars are shown diagrammatically by means of arrowheads in FIG. 12 on the line that represents pin bar movement, and throughout this figure part of the time the body pins are uppermost and part of the time the plug pins are uppermost as indicated by B/P and P/B, respectively.

The turnover carriers 78, 80, 82, 84 and 86 are mounted on shafts 88 as shown in FIGS. 2, 3, 7 and 8. In FIGS. 2 and 7 the three shafts 88 are journaled in vertically reciprocating bars 89, one on each side of the machine, and in FIGS. 3 and 8 the two shafts 88 are likewise journaled in vertically reciprocating bars 90. The bars 89 and 90 are vertically reciprocated by bell cranks 91 and 92 which are linked to the bars 90 and 91 and linked together by a link 93.

Referring to the shaft 88 in FIG. 7, a gear 100 is secured thereto and meshes with a stationary rack 101 so that vertical movement of the bar 89 results in rotation of the shaft. Thus the vertical reciprocations of the bar are translated into 180° oscillations of the shaft 88. The other four shafts 88 at stations (4), (8) (9) and (10) are similarly gear-and-rack driven and similar parts are similarly reference numeraled.

The bell cranks 91 and 92 are oscillated in synchronism with oscillations of the rocker lever 67 of FIGS. 5 and 10 through a system of links 94, 95 and 96 shown in FIGS. 10, 9, 4 and 3, a bell crank 95a, and levers 97, 98 and 99.

Referring to FIG. 7 the first turnover carrier 78 is in an elevated position in alignment with the crank 79. As it is lowered into alignment with the track 74 (at which time the carrier would be inverted as is the carrier 80 at station (7), the shaft 88 of the carrier 78 being then at the position indicated 88a) the carrier is turned over by means of a gear 100 on the shaft 88 which meshes with a stationary rack 101. Similarly the third and fifth turnover carriers 82 and 86 at stations (8) and (10) are rotated 180° during the movement from alignment with tracks 83 and 87 to alignment with the tracks 81 and 85. At the same time the turnover carriers 80 and 84 at stations (7) and (8) are elevated from alignment with the tracks 79 and 83 to alignment with the tracks 81 and 85 and turned through 180°.

At station (7) in FIG. 8 a quadrant-shaped holding pawl 102 is provided to prevent accidental movement of the pin bars PB out of the carrier 80 and a similar pawl 102 is provided at station (9) in FIG. 3. Similar quadrant-shaped holding pawls 103 are also provided for the turnover carriers at station (6) as shown in FIG. 7 and at stations (8) and (10) as shown in FIG. 2. The pawls 102 and 103 are normally biased to the position shown in FIGS. 3 and 8 when the turnover carriers are inverted as shown in these two figures (turnover carriers 84 and 80 respectively). When the turnover carriers are reverted as in FIGS. 2 (carriers 82 and 86) and 7 (carrier 78) they strike their adjacent tracks 79, 81, 83, 85 or 87 as the case may be to depress the pawls to permit the pin bars PB to be moved out of the turnover carriers. In FIG. 2 the pawls have been depressed by engaging the tracks 87 and 83 and in FIG. 7 by engaging the track 79.

For advancing the pin bars six at a time from left to right along the tracks 79 and 83 a vertical pin push bar 104 is provided in FIGS. 2 and 7, and for advancing them from right to left along the tracks 81 and 85 a vertical pin push bar 105 is provided in FIGS. 3 and 8. The bars 104 and 105 are carried by a system of horizontal slide bars 106, 107 and 108, the bars 106 and 107 being connected to the bar 108 by a crossbar 109 as shown in FIGS. 3 and 8. The bars 106, 107 and 108 are suitably guided for horizontal reciprocation and are reciprocated by a link 110 shown in FIG. 4 connected to a bell crank 111 shown in FIGS. 4 and 9. The bell crank 111 is linked at 112 to the bell crank 95. The various tracks such as 303, 74, 79, 81, 83, 85 and 87 are, of course, provided in pairs, one adjacent each side frame 165 and 166 of the machine.

The drying kiln DK operates at room temperature (about 72°) and the extended travel of the dipped pins of the pin bars from station (4) through stations (5), (6), (7), (8), (9), (10) and (11) to station (12) gives the necessary drying time. An exhaust hood 302 is shown in FIGS. 2 and 7 and the sections 42, 40 and DK of the machine are suitably encased for the proper flow of air into the right-hand end of the machine (FIGS. 6 and 11) and over the bodies and plugs on the pins. The back-and-forth movement of the pins in the drying kiln evens out the drying operations on the right and left sides of the plugs and bodies since they are turned over at stations (6), (7), (8), (9) and (10) so that opposite sides of the pins are directed toward the air flowing from right to left through the machine, and the air is then discharged into the exhaust hood 203 which is provided with the usual blower or the like for providing forced air circulation.

After the pin bars PB arrive at station (10) it is desirable to advance them one at a time to stations (11), (12), (17), (18), (19), (24) and (25). Thus single-bar advance is maintained while stripping the bodies and plugs from the pins and while greasing the pins, and the operations at turrets T1, T2 and T3 occur once per operating cycle of the machine. The rocker arm 67 is oscillated only once per six cycles because the dipping operation at stations (1) and (3) takes a relatively long time as compared with the other operations and this gives six times the amount the amount of time for slow dipping of the pins compared to the stripping and related operations.

The mechanism for advancing the bars one at a time comprises a series of five pawls 113 shown adjacent the track 87 in FIG. 2 carried by a slide bar 114 connected by a link 115 to a rock lever 116 shown in FIG. 3. The rock lever 116 is connected by a link 117 to a rock shaft 118 which is oscillated once each cycle of operation of the machine.

At station (11) shown in FIG. 4 the pin bars are received in slots 119 in the left ends of a pair of flop-over levers 120 which are shown in plan view in FIG. 28. They are held in the slots by three magnets 121 carried by a rod 122 which in turn is carried by the levers 120. The right-hand ends of the levers 120 are slotted to slide on spools 123, and a pair of levers 124 are mounted on the rock shaft 118 and provided with slot-and-roller connections to the rod 122 so that the flop-over levers 120 can be flopped over 180° clockwise in FIG. 4 to the dot-and-dash line position shown in FIG. 28 to deliver the pin bar (at position PB1) between stations (11) and (12) to bar carriers 125 that traverse from left to right in FIGS. 4 and 12 through stations (12), (17), (18), (19), (24) and (25). There are nine pin bars at positions indicated PB1 through PB9 in FIG. 4, PB2 and PB9 being idle positions. The rod 122 also has rollers 126 located in a cam slot 127 which is arcuate and has an initial portion extending horizontally to the left and numbered 128. A detail of this cam member is shown in FIG. 28A, where the cam slot 127–128 is illustrated more clearly.

Referring to FIGS. 4, 25, 25A, 26, 27 and 33, the bar carriers 125 are T-shaped in cross section and each is provided with a notch 130 to receive the end of the pin bar (see FIG. 25A) at position PB1. These bar carriers travel in upper T-shaped slots 131 and lower T-shaped slots 132 in the side frame 165 of the machine and which extend horizontally from a point between positions PB1 and PB2 thereof and ending at a point between positions PB8 and PB9 with certain exceptions which will be described. Below position PB1 the bar carriers 125 enter a lower T slot 133 of a transfer disc 135 shown in FIGS. 4 and 26, and this disc also has an upper T slot 134 in which there is another bar carrier 125. Accordingly, when the disc is rotated 180° clockwise in FIG. 4 the lower slot 133 becomes the upper slot and the upper slot 134 becomes the lower slot which happens once each cycle of operation effected by rotation of a mutilated gear 136 (FIG. 26) from a mutilated gear 137 which in turn is rotated by a sleeve 138. These gears are shown diagrammatically in FIG. 26A. The sleeve 138 is rotated once each cycle of operation of the machine and during about one-fourth of that rotation the gear 136 is rotated 180° whereas during the rest of the rotation of the gear 137 the edge of a mutilated disc 139 of the mutilated gear 138 coacts with a pair of studs 140 of the mutilated gear 136 to retain the gear 136 against rotation.

The sleeve 138 is rotated once each cycle of operation of the machine and in addition to rotating the transfer disc 135 to advance the bar carriers 125 along the tracks 131 it carries a cam 141 (see FIGS. 4 and 26) having a cam groove 142 acting upon a cam roller 143 carried by a pin bar pusher lever 144. The lever 144 at its upper end carries a bar pusher roller 345 which as shown in FIG. 4 directly engages a pin bar PB for pushing it and the bar carriers 125 at its ends along the upper T slot 131, from position PB1 to position PB2 in one cycle, from PB2 to PB3 in the next cycle and so on.

The pin bar at position PB9 is moved into a track 146 (shown also in FIG. 5) where, upon an accumulation of six bars, a pawl 145 moves them six at a time along the track 146 to the pin bar carrier 57. Additional pawls 147, 148 and 149 are also provided to advance the pin bars along the track 146 and into the carrier 57, thus completing the entire movement of the pin bars through the machine to the beginning station (1).

The bar carriers 125 at position PB9 in FIG. 4 are moved downwardly in a stack of four by a depressing arm 150 having shoulders 150ª to engage the uppermost bar carrier and depress it the thickness of one bar carrier. The bar carriers in the stack are held against displacement by means of their ends sliding back of a cover plate 151ª and along a pair of magnets 151 at each side of the machine, and the bottom bar carrier of the stack is then in alignment with the lower T slot 132. The bar carriers are moved step-by-step to the left along the slot 132 in FIG. 4 until they enter the transfer disc 135 which is spaced eight bar carrier widths from the stack of bar carriers at the magnets 151, thus completing the recirculating cycle of the bar carriers 125. The bar carriers are moved in the left-hand direction by a push bar 152 actuated by a bell crank 153 carrying a roller 154 coacting with a cam groove 155 of a cam 156 on a shaft 157 rotated once each cycle of operation of the machine. The path of the bar carriers 125 downwardly, to the left and upwardly is shown at 125ª in FIG. 12.

When a pin bar arrives at station (12) the twenty-five capsule plugs are ready to be stripped from the pins PP thereof. This is accomplished in the plug turret T1 above station (12). The turret has four elongated collet bars 161 which carry a multiplicity of collets 162, one for each pin of the pin bar. The pin bar is elevated until the plugs on the upper ends of the pins PP enter the collets 162, the collets being mounted in their collet bar for slight movement in any direction so that they will center automatically with respect to the plugs on the plug pins. Thereupon stripper plates 163 on opposite sides of the pins are moved toward each other below the plugs so that when the pins are moved downwardly again the plugs will stay in the collets, the collet internal diameters being such that the plugs are a snug fit therein.

Referring to FIG. 33, the pin bar directly below the turret T1 is indicated PB3 and is adapted to be elevated by a post 164 adjacent each side frame 165 and 166 mounted for vertical sliding movement and provided with rack teeth 167 meshing with a gear sector 168 on a rock shaft 169 which is oscillated once each cycle of operation of the machine. When the gear sector rotates clockwise the post 164 will be elevated for entering the upper end of the plug pin PP on the pin bar PB3 into the collet 162 directly above it and at the lower station (13) of the turret T1. The bar carrier 125 for the pin bar PB3 is at this time in a T slot 131ª of the post 164 aligned with the T slot 131 in the side frame 165, and the post has a T slot 132ª aligned with the T slot 132 (see FIG. 25). Thus when the post 164 is elevated the upper and lower bar carriers 125 in the T slots 131ª and 132ª are also elevated and then returned to the initial position shown in FIG. 33 by first right-hand oscillation and then left-hand oscillation of the gear sector 168.

During the elevation of the pin bars, since they are held only at their ends by the posts 64, it is desirable to have some means to prevent them from bending from their own weight. This is accomplished by a pair of scissor bars 170 pivoted on a shaft 171 which is carried by a pair of brackets 172 secured to the posts 164. As shown in FIG. 25 the left-hand pair of scissor bars 170 is spaced some distance from the post 164 and similarly the right-hand one would be spaced the same distance from the right-hand post (not shown). These scissor bars are notched adjacent their upper ends to engage opposite edges of the pin bar PB3 when the scissor bars are swung toward each other, and the swinging motion is accomplished by rollers 174 that travel in inclined cam slots 174 of a stationary cam bracket 176 during the first part of the elevating movement and are confined between vertical cam faces 175 of the cam bracket during the rest of the vertical movement.

The stripper plates 163 are mounted on slide bars 182 and are normally held spaced apart as in FIG. 33 by springs 177. They are moved toward each other by levers 178 pivoted at 179 and having rounded heads 180 on their lower ends bearing against projections 181 of the slide bars 182. The upper ends of the levers 178 carry rollers 183 which coact with cam faces 184 of a vertically reciprocable slide 185 carried by a slide plate 186. The slide plate has a horizontal slot 187 adjacent its lower end in which a roller 188 is movable, the roller being carried by an arm 189 mounted on a rock shaft 190 which is oscillated once per cycle of operation of the machine.

Referring to FIG. 19A where a plan view of portions of the stripper plates 163 are illustrated it will be noted that the edges of these plates are notched at 191 so that when they are brought substantially into contact with the plug pins PP they offer obstructions to the plugs P so that the pins can be pulled out of the plugs leaving the plugs in the collets 162.

Means is provided for pushing the plugs out of the collets 162 comprising a set of push pins 192 for each of the four sets of collets in the turret T1. These are carried by slide blocks 193 which at their ends are provided with rollers 194. The slides 185 are provided with cam grooves 195 for actuating the rollers 194 and thereby the slide blocks 193 and the push pins 192.

At station (14) a plug trimmer PT is provided, the details of which are shown in FIGS. 29, 30, 31 and 32. The turret T1 is indexed clockwise 90° to brinng the lowermost collets 162 and their plugs P into alignment with the plug trimmer PT shown in FIG. 4. There is the plug trimmer to the left of the turret T1 and a similar body trimmer BT in reverse to the right of the turret T2 which latter turret is for capsule bodies rather than capsule plugs and, accordingly, will be described later.

The turret T2 is a reversal of the turret T1 and is indexed 90° per cycle of operation of the machine counterclockwise instead of clockwise as in the turret T1. Operating mechanism for elevating the capsule bodies B on the body pins BP at station (19) to station (20) in substantially the same as described for stations (12) and (13) and are illustrated in FIG. 4, but due to the similarity will not be described in detail. Where comparable parts are reference numeraled they are distinguishable because of the addition a.

Referring to FIGS. 29, 30, 31 and 32, FIG. 31 shows a sectional view similar to the right-hand trimmer BT in FIG. 4 and is for the plug bodies. FIG 29 shows the far ends of the plug and body trimmers of FIG. 4 and, accordingly, the left-hand one is for bodies and the turret T2 and the right-hand one is for plugs and the turret T1. The body trimmer BT is also shown in FIGS. 30 and 31 which will now be referred to and will suffice for description of the trimmer PT for plugs.

The trimmer BT includes an arbor 196$^a$ which as shown in FIG. 29 is in alignment with the collet 162$^a$ at station (21) of the turret T2 to receive the capsule body from the collet when it is pushed therefrom by the push pin 192$^a$. As shown in FIG. 31 a gate 197$^a$ is in the way but this is elevated by horizontal movement of a cam 198$^a$ having an inclined upper surface that coacts with a roller 199$^a$ on a lever 200$^a$ that carries the gate 197$^a$. The cam is moved by rack teeth 201$^a$ carried thereby and meshing with a pinion 202$^a$ and an oscillatable shaft 203$^a$.

In FIG. 31 a groove 204$^a$ will be noted in the arbor 196$^a$ and the capsule body that fits on the arbor extends past this groove, the body being of sufficient length (51 in FIG. 2A) that the marginal open end thereof may be trimmed therefrom (53 in FIG. 2A) for uniformity of length of the capsule bodies. A sharpened-edge trimming disc 205$^a$ is located adjacent the groove 204$^a$ and has a flat side 206$^a$ normally in the position shown in FIG. 32 so that the cutting edge of the disc will not interfere with movement of the capsule body onto and off the arbor 196$^a$. After the capsule body is on the arbor the disc 205$^a$ is rotated substantially 180° clockwise in one cycle (and counterclockwise in the next to even the wear on the knife edge). At the same time the arbor 196$^a$ and the capsule body thereon are rotated so that the sharpened edge of the trimming disc will trim off the marginal open end of the capsule body.

Rotation of the trimming disc 205$^a$ is accomplished by a pinion 207$^a$ on the shaft of the trimming disc meshing with a reciprocable rack 208$^a$ moved toward the left in FIG. 30 in one cycle of operation of the machine and toward the right in the next cycle. The arbor 196$^a$ has a pinion 209$^a$ thereon meshing with the pinion 207 for imparting simultaneous rotation to the arbor at a greater speed than the trimming disc 205$^a$.

The trimming disc and the arbor rotate in opposite directions. The disc, however, turns through 360° so that the second half of the circumference is not doing any cutting but does actually contact the cut capsule during the last half of its stroke. During the cutting the cutting edge of the trimming disc and the surface speed of the capsule is about the same. During the next trimming operation the disc rotates in the opposite direction. Consequently the half of the circumference which was idle during the first cycle does the cutting during the second cycle and the half which did the cutting is now idle. In this way the cutting edge of the disc has a life which is twice as long as one of exactly the same diameter as the arbor.

Within each arbor 196$^a$ is a push pin 210$^a$ to push the capsule body off the arbor after the trimming operation has been completed. At this time the stripper bar 197$^a$ is permitted to ride on the arbor after the body is clear of the bar. The push pin 210$^a$ pushes the capsule body back into the collets of the turret T2, the push pins 192$^a$ therein having ben retracted by this time. The push pins 210$^a$ are all connected to a bar 211$^a$ which has a pair of racks 212$^a$ connected therewith mesh with pinions 213$^a$ on a shaft 214$^a$. A bevel gear 215$^a$ is provided on one end of the shaft 214$^a$ as shown in FIG. 30 and meshes with a bevel gear 216$^a$ operatively connected with a rock arm 217$^a$ which is oscillated once each cycle of operation of the machine.

The opposite end of the shaft 214$^a$ is provided with a bevel gear 218$^a$ meshing with a bevel gear 219$^a$ for the purpose of oscillating a latch 220$^a$. The bevel gear 216a oscillates a similar latch 221$^a$. The latches are adapted to coact with the levers 200$^a$ to hold the stripper bar 197$^a$ elevated until the latches are released. The latches are spring biased (see springs 305$^a$) and have pins 298$^a$ adapted to be engaged by latch actuators 297$^a$ operated by the bevel gears 216$^a$ and 219$^a$. The shaft 203$^a$ is oscillated by means of an arm 222$^a$ thereon shown in FIG. 30 and a link 223 which is also shown in FIG. 31 as connecting the two arms 222 and 222$^a$ for the two trimmer assemblies PT and BT together for simultaneous oscillation of the shafts 203 and 203$^a$ and thereby the shafts 214 and 214$^a$ in opposite directions.

For stripping the capsule body and its ring-like trimmed-off open end from the arbor, a stripper bar 224$^a$ (see FIG. 30) is provided having a U-shaped notch 225$^a$ for each arbor. The stripper bar 224$^a$ is carried by the racks 212$^a$ and, accordingly moves therewith and simultaneously with the push pins 210$^a$. One of the big problems in connection with the successful operation of the machine has been getting rid of the annular ring trimmed off the open end of the capsule bodies and plugs which is waste material. This waste ring has great adhesion for the arbor 196$^a$ and is very difficult to strip. The adhesive effect is due to static electricity. Attempts have been made to blow these waste rings off and do all sorts of things to free them but because they are so light in weight and because the static charge is so great there is no way to get them off except by physically pushing them from the arbor.

Unfortunately, as the stripper bar 224$^a$ retracts, the static charge is sufficient to cause the waste rings to retract with them. Consequently it is necessary to provide other means to insure removal of the rings from the arbors. This means takes the form of the gate 197$^a$ heretofore described which is unlatched by the latches 220$^a$ after the capsule bodies are pushed off the arbors 196$^a$ into the collets 162$^a$ whereupon the gate drops down onto the push pins 210$^a$ and rides them thus intercepting the waste rings which would otherwise get hung up on the push pins 210$^a$. The gate 197$^a$ thus holds the waste rings until the push pins are retracted and during retraction the gate serves to scrape the rings off the push pins whereupon the gate falls a short distance after the pins have been retracted to the position shown in FIG. 31. At this point the gate is raised to its elevated position above the arbor to permit the next capsule bodies to be placed on the arbors for trimming. The annular waste rings which are removed from the push pins of both trimmers PT and BT fall down into hoppers 226 and 226$^a$ shown in FIG. 4, where a hopper is shown for each of the two trimmers. These hoppers are connected to a vacuum line to remove the waste rings from the machine.

After the trimming operation has been completed, the turrets T1 and T2 index another 90° so that the collets with the trimmed capsule bodies and plugs in them are at the tops of the turrets (stations (15) and (22)), these being idle stations.

The turrets are then indexed another 90° so that the trimmed plugs and bodies are at stations (16) and (23), respectively, at which point (FIGS. 4 and 33) the socket bar SP for plugs and the socket bar SB for bodies will be found. These socket bars are mounted on opposite sides of a vertical plate 227 slidable longitudinally in a groove of a guide plate 228. The socket bars carry a series of plug and body collets 230 and 231, one for each plug and body received from the collets 162 and 162$^a$ of the turrets T1 and T2. The assembly of socket bars SP and SB and the vertical plate 227 form a transport bar assembly for transporting the plugs and collets from the turrets T1 and T2 in section 40 of the machine as shown in FIG. 11A to the turret T3 in the filling and joining section 44, the details of which will be described later.

Returning to station (13) in FIGS. 4 and 33, after a pin bar returns from station (13) to station (12) it is advanced toward the right to position PB4 where it is inverted after which the plug pin PP is down as shown and the body pin BP with a capsule body on it is up. This is accomplished by the bar carrier at one end of the pin bar having entered a T slot 131b of a turnover disc 232 at station (17) which as shown in FIG. 27 is carried by a shaft 233 which is rotated 180° each cycle of operation of the machine. The capsule body B on the body pin BP is now ready for stripping into the turret T2 after the pin bar reaches position PB6.

The pin bar now moves again to the right arriving at station (18) (position PB5) where the plug pin PP is to be greased in plug pin greasers PG, one for each pin. For this purpose the bar carriers 125 enter a pair of vertically movable posts 234 which are shown in FIGS. 14 and 15 and have upper T slots 131c and lower T slots 132c for the bar carriers in a manner similar to the posts 164. The posts 234 are adapted to be lowered simultaneously with the raising of the posts 164 and for this purpose are provided with rack teeth 235 meshing with the gear sector 168.

The plug pin greasers PG are mounted vertically below the pin bar at position PB5 and are in the form of sleeves shown in cross section in FIG. 17 having felt rings 236 charged with grease, and felt discs 237 therebelow mounted on springs 238. The sleeves are carried by shafts 239 projecting upwardly from and journaled in a cover plate 317 of a gear housing 240 (see FIG. 4). A wobble plate 310 is mounted in the housing 240 and gyratory movement is imparted thereto by means of a crank pin 311 of small throw on a crank shaft 312. Each of the shafts 239 has a crank pin 316 journaled in the plate 310 whereby gyratory motion of the plate rotates each shaft 239. The crank shaft 312 is driven by bevel gears 313 and 314 from a shaft 246 as shown in FIG. 9 which in turn is rotated by a motor 247 shown in FIG. 15.

The shafts 239a of the body pin greasers BG shown in FIG. 18 are likewise provided with crank pins 316a driven by the wobble plate 310 and effect greasing of the body pins at position PB8 or station 25 in a manner similar to the plug pins at position PB5, after the pin bars are turned over at station (24).

Next the pin bar is advanced to the position PB6 at station (19) below station (20) and the turret T2 where mechanism similar to that described at station (12) below station (13) of the turret T1 is provided and operates in a similar manner to raise the pin bar at PB6 and deposit the body B on the upper end of the upwardly projecting body pin BP in a collet 162a of the turret T2. The parts at stations (19) and (20) and within the turret T2 have the same reference numerals with the addition of the distinguishing characteristic *a*.

Next the pin bar at position PB6 is advanced to position PB7 or station (24) where a disc 232a similar to the disc 232 inverts the pin bar so that the body pin can be greased at position PB6 in the body pin greaser BG. The pin bar at PB6 is raised and the pin bar at PB8 lowered simultaneously through racks and a gear sector similar to those already described at 167, 168 and 235. The post 234a as shown in FIG. 4 has the depressing arm 150 mounted thereon for depressing the bar carriers 125 at the position PB9 from alignment with the upper T-slots 131 to alignment with the lower T-slots 132 prior to actuation of the push bar 152 for recirculating the bar carriers.

After the position PB9 the pin bars are advanced along the tracks 146 as already described to station (1) to begin the next cycle of pin bar movement through the machine.

Returning now to the socket bars SP and SB and the vertical plate 227 which form a transport bar assembly, the means for moving this assembly from section 40 of the machine to section 46 thereof is shown in FIG. 14 and comprises a connecting rod 248 pivoted at 249 to an oscillating arm 250 mounted on a rock shaft 251. A pinion 252 is secured to the rock shaft and meshes with a reciprocable rack 253 which is reciprocated once each cycle of operation of the machine. The arm 250 is provided with pads 254 and 256 adapted to be stopped by stationary pads 255 and 257.

In FIGS. 14 and 15 the transport bar assembly is at its left-hand position in section 40 of the machine whereas the section 44 is shown in FIG. 15 at the right where the transport bar assembly will be positioned within the fill turret T3 when the rock shaft 251 is rotated 180° clockwise in an obvious manner. The transport bar assembly requires a truck and roller mounting which I provide in the form of a supporting bar 258 shown in cross section in FIG. 33 having plate engagers 229 at its ends. The plate engagers are for the plate 227 and have notches in their lower ends as shown in FIG. 33 to engage the upper edge of the plate. The bar 258 has a series of rollers 259 and 261 travelling in grooves 262 and 264, respectively, of a box-like frame member 265, and rollers 260 which ride against faces 263 of the frame 265. There is one roller 261 on the far side in FIG. 14 travelling in the groove 264 shown in FIG. 15 by solid lines, and one on the near side in FIG. 15 travelling in a groove 264 which is shown by dot-and-dash lines. The grooves 264 effect horizontal movement of the transport bar assembly and have upturned ends 264a which at the end of the motion in the turret T3 cause the bar 285 and its plate engagers 229 to be elevated slightly as in FIG. 19 in order to release the transport bar assembly at station (26) so that the turret T3 can be indexed. At the same time, an empty transport bar assembly is indexed from station (29) to station (26).

The indexing is clockwise to station (27) shown in FIG. 20. At station (26) it will be noted that the plugs P and bodies B carried by the socket bars SP and SB are in alignment with each other. They are then moved to station (27), still in alignment with each other, but at this station means is provided for offsetting all the plugs from one pin bar relative to all the bodies from another pin bar so that the bodies can be filled with powdered medicament from the hopper 268 which has a nozzle 269 aligned with charge measuring bushings 270 in a plate 271. The lower surfaces of the bushings slide on a stationary plate 272 from the position of FIG. 19 to the position of FIG. 20 where the charges of powdered medicament in the bushings drop into the bodies B.

Figure 22:
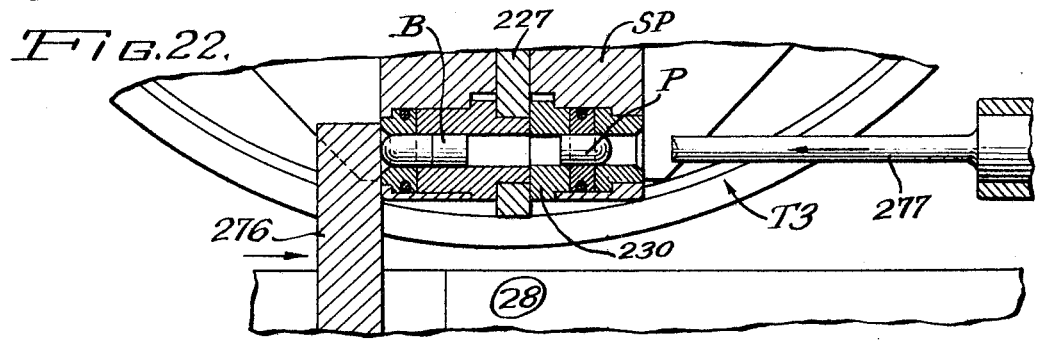
Figure 23:
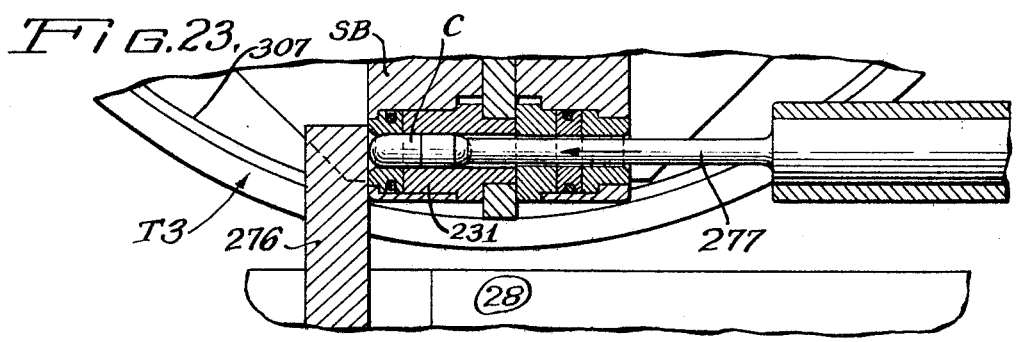

The motion of the plate 271 to the left is imparted through a bracket 275 and a thrust rod 273 to the socket bar SP which is movably mounted on the plate 227 whereas the socket bar SB is stationary thereon. Each end of the socket bar SP is provided with a roller 306 running in an annular groove 307 having part thereof in the thrust rod 273 as shown at 308 in FIG. 20. As the bar 271 moves toward the right from the position of FIG. 20 to the position of FIG. 19 lock nuts 274 are engaged by the bracket 275 to return the plug P into alignment with the body B whereupon the turret T3 is indexed another 90° clockwise so that the filled body and the plug therefor are at station (28). A further enlargement is shown in FIG. 21 at station (28) where the plug is ready to be pushed into the body and the capsule discharged. As shown in FIG. 22 a backing plate 276 is first moved into contact with the body B while a push pin 277 is moving toward the plug and in FIG. 23 the backing plate 276 has stopped its movement and the push pin 277 continued its movement to push the plug into the body.

Figure 24:
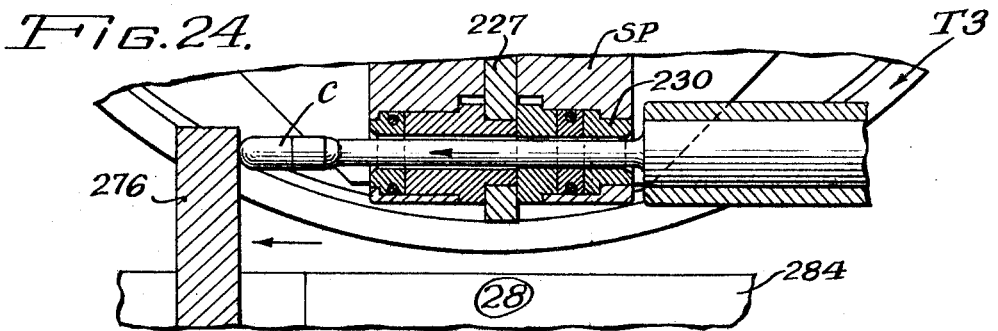

Thereupon it is desirable to discharge the filled and joined capsule from the turret T3 and this is accomplished by simultaneous movement of the backing plate 276 and the push pin 277 to the left as in FIG. 24 whereupon movement of the push pin 277 to its initial position shown in FIG. 21 will let the filled capsule drop into a tray, conveyor or the like.

The turret T3 is now indexed another 90° to station (29) which is an idle station. Then another 90° indexing causes the empty transport bar assembly to arrive at station (26) where it is picked up by the transport bar truck 229–258 and returned from section 44 to section 40 of the machine ready to receive another charge of bodies and plugs. Thus, there are four of the transport bar assemblies, an empty one of which is returned to position between the turrets T1 and T2 to receive plugs and bodies and then brought back to the turret T3 to pass through stations (27), (28) and (29) before it is returned again to section 40 of the machine to receive additional plugs and bodies.

Referring to FIG. 19 the bracket 275 is secured to a plate 278 mounted on a slide bar 279 rocked by a rock lever 280 and a link 281 connected to a lever 282 of a rock shaft 283 which is oscillated once each cycle of operation of the machine. The backing plate 276 is mounted on another slide bar 284 which is also rocked by the rock lever 280 through a link 281.

The push pin 277 is carried by a slide bar 285 which is reciprocated from a rock shaft 286 through a link 287 and a lever 288 mounted on the rock shaft. This rock shaft also is oscillated once each cycle of operation of the machine.

With respect to drive means for the various rock shafts and the like, in FIG. 4 a cam shaft 289 (shown dotted) is indicated which is located in the drive section 46 of the machine and which has suitable cams thereon for imparting desired patterns of reciprocation to racks or the like. By way of example, the rock shaft 68 shown in FIG. 5 may be driven as illustrated diagrammatically in FIG. 5A by means of a cam 290 rotating once per six cycles of operation of the machine or one-sixth revolution per cycle (indicated ⅙ r.p.c. adjacent the cam). The cam has a cam groove 291 coacting with a roller 292 on a rack 293 and thus the rack is reciprocated to impart oscillations to a pinion 294 on the rock shaft 68. Since FIG. 5A is only diagrammatic the cam groove 291 is shown of regular shape similar to an eccentric whereas it would be suitably contoured to produce the desired amount of reciprocation per increment of rotation in a manner well known in the engineering art. For driving the shafts 159, 160, 159a and 160a and the sprocket 73 in FIGS. 5 and 6 an intermittently rotated shaft 295 may be provided connected by an array of bevel gears as diagrammatically illustrated. The shaft 295 may be driven from the cam shaft 289 through a suitable mutilated gear arrangement somewhat similar to that shown in FIG. 26A except, of course, modified to provide one revolution of intermittent movement per six machine cycles.

Rock shafts such as 118, 157, 169 and 190 and the sleeve 138 may be riven from the cam shaft 289 by means of cams directly secured thereto and actuating racks or the like such as shown at 293 in FIG. 5A, which cams would, of course, rotate only once per cycle of operation of the machine.

The turrets T1, T2 and T3 may be indexed by means of suitable mutilated gear arrangements which, however, form no part of my present invention. A turret rotating gear 296 is shown in FIG. 25.

At stations (2) and (4) where the pin bars are turned over, and at stations (1) and (3) where the pins are dipped, detent means is provided to prevent the pin bars from sliding out of the slots of the pin bar carriers 59 and 59a and out of the slots 58 and 58a of the pin bar carriers 57 and 57a whereas at station (17) and (24) the pin bars are in the notches 130 of the bar carriers 125 and accordingly cannot fall out. In FIG. 10A a detail of such detent means is shown and comprises detent balls 299 entering depressions 301 formed in the ends of each pin bar, two of the balls being provided for coaction with the first and sixth bars in the slots of the pin bar carrier.

My apparatus is designed to operate at a temperature of 72° F. and about 50% relative humidity. Not only is the drying more effective at this temperature but it is necessary to maintain the temperature of the pins at about room temperature in order to obtain a satisfactory dip. It will be understood that the temperature of the pin determines to a large extent the thickness of the film deposited on the pin. If the pin is at an elevated temperature, say 85° or 90°, the gelatin will flow instead of gelling on the pin.

The pin bars are arranged to use both sides, one for plugs and the other for bodies. This provides twice as much production from a single bar such as found in the prior art.

My machine is so designed that filling mechanism is provided for the capsules as well as a means for manufacturing empty capsules, all in a single machine. This eliminates the intermediate steps required between a forming machine and a filling machine such as heretofore practiced in the prior art.

The arrangement of the machine in four units DK, 40, 42, 44 and 46 as shown in FIG. 11A provides for each section to be independent of the other so that any one of the four can be removed and replaced by a spare section if necessary in order to keep the apparatus in operation in the case of a breakdown. Furthermore, by building the machine sections in this manner it is possible to dismantle it quickly for shipment or for movement from one place in the plant to another.

Another advantage in having the kiln separate is to facilitate the changing of the size of the pins. There are about 750 pin bars in the kiln, each of which has 25 pins on either side or a total of fifty pins. Rather than changing all of these bars and replacing them for those that have longer pins it is much simpler to merely wheel out the kiln (it is provided with wheels 315 for this purpose) and put in a new one which has the larger bars and pins attached. The dipping and cutting portions of the machine, however, have to be changed manually. In other words, each of the bars in that portion of the machine have to be taken off and replaced with other bars having the longer pins or the shorter pins as the case may be. FIGS. 4 and 28 show extensions 165a on the side frame 165 bolted at 165b to facilitate this operation.

From the foregoing specification it is believed obvious that I have provided an apparatus for forming and filling hard shell capsules which is completely automatic so that gelatin and powdered medicament may be supplied thereto and the capsules will be formed, dried, trimmed, filled and closed before they issue from the machine. The machine is capable of cycling about once per second so that twenty-five capsules per second are discharged from the turret T3. By careful regulation of the temperature of the gelatin in the tanks TB and TP and the temperature and humidity of air passing through the machine and discharged from the exhaust hood 302 adequate time is given for complete drying of the capsules prior to stripping them from the pins and trimming and filling them. If desired, unfilled capsules can be discharged from the machine by omitting the filling step at station (27) whereby the machine is capable of producing closed capsules to be subsequently opened and filled. The mechanism for causing operation at station (27) may be thrown out of operation for this purpose.

Some changes may be made in the construction and arrangement of the parts of my capsule forming and filling machine without departing from the real spirit and purpose of my invention, and it is my intention to cover by my claims any modified forms of structure or use of mechanical equivalents which may reasonably be included within their scope.

I claim as my invention:
1. In a capsule forming apparatus, a plurality of pin bars having a set of plug pins extending from one side of each bar and a set of body pins extending from the other side thereof, first and second dipping tanks for gelatin or the like, a first means for conveying pin bars across the tops of said dipping tanks, lowering the pin bars for dipping one set of pins in the first dipping tank, inverting the pin bars between said dipping tanks, lowering the pin bars for dipping the other set of pins in said second dipping tank and again inverting said pin bars, a drying kiln for the capsule bodies and plugs formed on said body and plug pins, a second means for traversing said pin bars back and forth through said drying kiln, a pair of stripping stations, one for capsule plugs and the other for capsule bodies, a third means for conveying the pin bars in a line past said stripping stations and displacing each bar at each of said stripping stations from the conveying line to a position for stripping the capsule plugs and bodies therefrom, a turret at each of said stripping stations to receive the capsule plugs and bodies stripped from said pin bars, a first inverting means between said stripping stations to invert said pin bars, a first greasing means for the first-stripped pins of said pin bars when so inverted, a second inverting means between said second stripping station and said first dipping tank to invert the pin bars, and a second greasing means for the second stripped pins of said pin bars when so inverted.

2. A capsule forming apparatus in accordance with claim 1 wherein said first means includes vertically reciprocable carriers for the dipping operations and rotating carriers for the inverting operations, said carriers each carrying a plurality of pin bars.

3. A capsule forming apparatus in accordance with claim 1 wherein said second means includes carriers for pluralities of pin bars, and means for simultaneously rotating said carriers and reciprocating them vertically to turn the pin bars over in the drying kiln and move them to successively different levels during back-and-forth traversal thereof through said drying kiln.

4. A capsule forming apparatus in accordance with claim 1 wherein said third means conveys the pin bars one at a time past said stripping stations.

5. A capsule forming apparatus in accordance with claim 4 wherein said third means comprises a pair of carriers for each pin bar, and means is provided for moving said last carriers from a conveying line, returning them in the opposite direction and inserting them back into the conveying line.

6. A capsule forming apparatus in accordance with claim 5 wherein said last means includes magnetic holding surfaces for said last carriers across which they may slide, and cyclically operable means for engaging the successive carriers as they arrive at said magnetic holding surfaces and for moving them in a stack across said surfaces.

7. A capsule forming apparatus in accordance with claim 6 wherein track means is provided for said last carriers which extend parallel to the conveying line, and means is provided for cyclically engaging the carriers at the outlet end of the stack held by said surfaces and moving the carriers in an opposite direction along said track means.

8. A capsule forming apparatus in accordance with claim 7 wherein transfer means is provided to receive the carriers from said track means and transfer them from alignment with the track means to alignment with the track means to alignment with the conveying line.

9. A capsule forming apparatus in accordance with claim 5 wherein said last means includes means to displace the carriers in one direction from the conveying line after the two greasing operations, move them in a direction opposite their direction of movement along the conveying line, and displace them in the opposite direction to a position of alignment with the conveying line.

10. A capsule forming apparatus in accordance with claim 1 wherein stripping means is provided at each of said stripping stations and comprises a pair of stripping plates on opposite sides of the pins of said pin bars which have notched edges to receive the pins, said stripping plates being spread apart while said pin bars are being displaced, and means for moving them towards the pins after displacement and back of the rear edges of the capsule plugs and bodies on the pins while the pins are being retracted to said conveying line.

11. A capsule forming apparatus in accordance with claim 1 wherein said greasing means comprise tubular sockets of resilient material, and means for rotating said sockets to more effectively grease the pins.

12. A capsule forming apparatus in accordance with claim 1 wherein means for trimming the marginal ends of said capsule plugs and bodies is provided adjacent said turrets.

13. In a capsule forming and filling apparatus, a plurality of pin bars having a set of plug pins extending from one side of each bar and a set of body pins extending from the other side thereof, first and second dipping tanks for gelatin or the like, a first means for conveying pin bars across the tops of said dipping tanks, lowering the pin bars for dipping one set of pins in the first dipping tank, inverting the pin bars between said dipping tanks, lowering the pin bars for dipping the other set of pins in said second dipping tank and again inverting said pin bars, a drying kiln for the capsule bodies and plugs formed on said body and plug pins, a second means for traversing said pin bars back and forth through said drying kiln, a pair of stripping stations, one for capsule plugs and the other for capsule bodies, a third means for conveying the pin bars in a line past said stripping stations and displacing each bar at each of said stripping stations from the conveying line to a position for stripping the capsule plugs and bodies therefrom, a turret at each of said stripping stations to receive the capsule plugs and bodies stripped from said pin bars, a first inverting means between said stripping stations to invert said pin bars, a first greasing means for the first-stripped pins of said pin bars when so inverted, a second inverting means between said second stripping station and said first dipping tank to invert the pin bars, a second greasing means for the second-stripped pins of said pin bars when so inverted, a filling, joining and discharging turret, and means for transferring the stripped capsule plugs and bodies from said first two turrets to said filling, joining and discharging turret.

14. A capsule forming and filling apparatus in accordance with claim 13 wherein said first means includes vertically reciprocable carriers for the dipping operations and rotating carriers for the inverting operations, said carriers each carrying a plurality of pin bars.

15. A capsule forming and filling apparatus in accordance with claim 13 wherein said second means includes carriers for pluralities of pin bars, and means for simultaneously rotating said carriers and reciprocating them vertically to turn the pin bars over in the drying kiln and move them to successively different levels during the back-and-forth traversal thereof through the drying kiln.

16. A capsule forming and filling apparatus in accordance with claim 13 wherein said third means conveys the pin bars one at a time past said stripping stations.

17. A capsule forming and filling apparatus in accordance wtih claim 16 wherein said third means comprises a pair of carriers for each pin bar, and means is provided for removing said last carriers from the conveying line, returning them in the opposite direction and inserting them back into the conveying line.

18. A capsule forming and filling apparatus in accordance with claim 17 wherein said last means includes magnetic holding surfaces for said last carriers across which they may slide, and cyclically operable means for engaging the successive carriers as they arrive at said magnetic holding surfaces and for moving them in a stack across said surfaces.

19. A capsule forming and filling apparatus in accordance with claim 18 wherein track means is provided for said last carriers which extend parallel to the conveying line, and means is provided for cyclically engaging the carriers at the outlet end of the stack held by said surfaces and moving the carriers in an opposite direction along said track means.

20. A capsule forming and filling apparatus in accordance with claim 19 wherein transfer means is provided to receive the carriers from said track means and transfer them from alignment with the track means to alignment with the conveying line.

21. A capsule forming and filling apparatus in accordance with claim 17 wherein said last means includes means to displace the carriers in one direction from the conveying line after the two greasing operations, move them in a direction opposite their direction of movement along the conveying line, and displace them in the opposite direction to a position of alignment with the conveying line.

22. A capsule forming and filling apparatus in accordance with claim 13 wherein stripping means is provided at each of said stripping stations and comprises a pair of stripping plates on opposite sides of the pins of said pin bars which have notched edges to receive the pins, said stripping plates being spread apart while said pin bars are being displaced, and means for moving them towards the pins after displacement and back of the rear edges of the capsule plugs and bodies on the pins while the pins are being retracted to said conveying line.

23. A capsule forming and filling apparatus in accordance with claim 13 wherein said greasing means comprise tubular sockets of resilient material, and means for rotating said sockets to more effectively grease the pins.

24. A capsule forming and filling apparatus in accordance with claim 13 wherein means for trimming the marginal ends of said capsule plugs and bodies is provided adjacent said turrets.

25. A capsule forming and filling apparatus in accordance with claim 24 wherein said trimming means includes a trimming disc for each capsule plug and body, said discs each being cut off along one side to permit axial movement of the plugs and bodies to trimming position, and means for thereupon rotating the plugs and bodies and for rotating said discs.

26. A capsule forming and filling apparatus in accordance with claim 24 wherein arbors are provided for receiving said plugs and bodies from said turrets, trimming discs for the plugs and bodies on said arbors, said arbors being grooved for the edges of said discs, and means for relatively rotating said arbors and discs.

27. A capsule forming and filling apparatus in accordance with claim 24 wherein arbors are provided for receiving said plugs and bodies from said turrets, said trimming discs cooperating therewith to trim the ends from said plugs and bodies, extensible push pin means slidable in said arbors to thereafter return the plugs and bodies to the turrets, and gates operable to retain the trimmed-off ends of said plugs and bodies on said push pin means during the extension thereof and to thereafter scrape said trimmed off ends off said push pin means upon retraction thereof.

28. A capsule forming and filling apparatus in accordance with claim 27 wherein strippers are provided movable along said arbors simultaneously with the extension of said push pin means to strip the plugs and bodies and their trimmed-off ends from said arbors.

29. A capsule forming and filling apparatus in accordance with claim 13 wherein said means for transferring the stripped capsule plugs and bodies from said first two turrets to said filling, joining and discharging turret comprises a pair of socket bars between said first two turrets to receive the plugs and bodies from both of them and means for carrying said socket bars from alignment with said first two turrets and depositing them in said filling, joining and discharging turret.

30. A capsule forming and filling apparatus in accordance with claim 29 wherein means is provided to release said socket bars within said filling, joining and discharging turret for filling, joining and discharging operations therein.

31. A capsule forming and filling apparatus in accordance with claim 30 wherein said transferring means picks up empty socket bars from said last turret after it has indexed and returns them to a position adjacent said first two turrets to receive further plugs and bodies.

32. A capsule forming and filling apparatus in accordance with claim 13 wherein socket bars receive the plugs and bodies from said stripping turrets and transfer them to said filling, joining and discharging turret, and means is provided in the latter turret for relatively offsetting the plugs and bodies so that medicament can be discharged into the bodies and for bringing them back into alignment prior to joining and discharging the same therefrom.

33. A capsule forming and filling apparatus in accordance with claim 32 wherein said filling means includes filling pockets movable from positions aligned with a hopper to positions aligned with the bodies, and means for moving the same and simultaneously therewith moving the plugs out of alignment with the bodies and for thereafter returning the filling pockets to the hopper and the plugs to alignment with the bodies.

34. A capsule forming and filling apparatus in accordance with claim 29 wherein means is provided in the latter turret for relatively offsetting the plugs and bodies so that medicament can be discharged into the bodies and for bringing them back into alignment prior to joining and discharging the same therefrom.

35. A capsule forming and filling apparatus in accordance with claim 32 wherein said filling means including filling pockets movable from positions aligned with a hopper to positions aligned with the bodies, and means for moving the same and simultaneously therewith moving the plugs out of alignment with the bodies and for thereafter returning the filling pockets to the hopper and the plugs to alignment with the bodies.

36. A capsule forming and filling apparatus in accordance with claim 30 wherein means is provided in the latter turret for relatively offsetting the plugs and bodies so that medicament can be discharged into the bodies and for bringing them back into alignment prior to joining and discharging the same therefrom.

37. A capsule forming and filling apparatus in accordance with claim 30 wherein said filling means include filling pockets movable from positions aligned with a hopper to positions aligned with the bodies, means for moving the same and simultaneously therewith moving the plugs out of alignment with the bodies and for thereafter returning the filling pockets to the hopper and the plugs to alignment with the bodies.

38. A capsule forming and filling apparatus in accordance with claim 13 wherein joining and discharging means for the filled capsules are provided in the form of a backing plate and a push pin movable toward each other to insert the plug in the body, and then movable in the same direction for moving the capsule out of the socket bars whereupon the push pin retracts for permitting the capsule to drop away from the backing plate and the push pin.

39. A capsule forming and filling apparatus in accordance with claim 36 wherein joining and discharging means for the filled capsules are provided in the form of a backing plate and a push pin movable toward each other to insert the plug in the body, and then movable in the same direction for moving the capsule out of the socket bars whereupon the push pin retracts for permitting the capsule to drop away from the backing bar and the push pin.

40. A capsule forming and filling apparatus in accordance with claim 37 wherein joining and discharging means for the filled capsules are provided in the form of a backing plate and a push pin movable toward each other to insert the plug in the body, and then movable in the same direction for moving the capsule out of the socket bars whereupon the push pin retracts for permitting the capsule to drop away from the backing bar and the push pin.

41. A capsule forming apparatus in accordance with claim 5 wherein said carriers are notched to receive the ends of said pin bars, and flop-over means in provided for inserting said ends into said notches.

42. A capsule forming apparatus in accordance with claim 41 wherein said flop-over means is provided with magnets to hold the pin bars therein while they are being flopped-over and entered into said notches.

43. A capsule forming apparatus in accordance with claim 1 wherein said third means for displacing each bar at each of said stripping stations includes notched bars which are movable to engage their notches with the edges of the bars intermediate their ends to support them against bending during the displacing and stripping operations.

44. A capsule forming apparatus in accordance with claim 1 wherein said third means moves in one direction during the displacing operation and said greasing means moves in the opposite direction, a rack carried by each of said last two means, and a gear between said racks, meshing with them and oscillated in one direction and then the other during each cycle of operation of the machine.

45. A capsule forming apparatus in accordance with claim 12 wherein said stripping turrets have push pins to push the plugs and bodies out of said turrets and into said trimming means.

46. A capsule forming apparatus in accordance with claim 45 wherein socket bars are provided between said turrets for receiving the plugs and bodies therefrom, said push pins being operable to push the plugs and bodies out of said turrets and into said socket bars, and roller and cam groove means for moving said push pins.

47. A capsule forming apparatus in accordance with claim 46 wherein said cam groove means is connected with said third means to be operated thereby when the same displaces the pin bar from the conveying line to stripping position.

48. A capsule forming apparatus in accordance with claim 1 wherein said means for lowering the pin bars for dipping the pins and for inverting the pin bars between dipping tanks and after the second dipping tank are provided with spring-pressed detents coacting with the ends of the pin bars to hold them against displacement therefrom during operation thereof.

49. A capsule forming and filling apparatus in accordance with claim 13 wherein said means for transferring the stripped capsule plugs and bodies from said first two turrets to said filling, joining and discharging turret comprises a pair of socket bars for receiving the plugs and bodies, carrier means therefor, an oscillatable shaft which is oscillated once each cycle of operation of the machine, a crank arm thereon and a connecting rod from said crank arm to said carrier means.

References Cited by the Examiner

UNITED STATES PATENTS

| | | | |
|---|---|---|---|
| 355,193 | 12/1886 | Merz | 18—25 |
| 525,844 | 9/1894 | Hobbs | 18—25 |
| 2,241,176 | 5/1941 | Boecler et al. | 18—25 X |
| 2,575,789 | 11/1951 | Bogin | 18—25 X |
| 2,869,178 | 1/1959 | Kath | 18—25 |
| 2,936,493 | 5/1960 | Scherer | 18—25 X |

FRANK E. BAILEY, *Primary Examiner.*

L. S. BOUCHARD, *Assistant Examiner.*